United States Patent [19]
Paggeot et al.

[11] Patent Number: 5,297,142
[45] Date of Patent: Mar. 22, 1994

[54] DATA TRANSFER METHOD AND APPARATUS FOR COMMUNICATION BETWEEN A PERIPHERAL AND A MASTER

[75] Inventors: Bruce M. Paggeot, Carpentersville; Jeffrey W. Tripp, Grayslake; Patrick J. Marry, Huntley, all of Ill.

[73] Assignee: Motorola, Inc., Schaumburg, Ill.

[21] Appl. No.: 732,511

[22] Filed: Jul. 18, 1991

[51] Int. Cl.⁵ .......................... H04J 3/16; H04Q 7/00
[52] U.S. Cl. .................. 370/85.6; 370/95.1; 379/63; 340/825.5
[58] Field of Search ............. 370/95.1, 95.3, 85.2, 370/85.3, 85.1, 85.6, 94.1, 99; 379/58, 59, 63; 340/825.5, 825.51

[56] References Cited

U.S. PATENT DOCUMENTS

| | | | |
|---|---|---|---|
| 4,369,516 | 1/1983 | Byrns | 375/110.1 |
| 4,482,999 | 11/1984 | Janson et al. | 370/60 |
| 4,534,025 | 8/1985 | Floyd | 370/94.1 |
| 4,539,677 | 9/1985 | Lo | 370/94.1 |
| 4,580,266 | 4/1986 | Kletzkine et al. | 370/85.2 |
| 4,593,282 | 6/1986 | Acampora et al. | 370/79 |
| 4,603,418 | 7/1986 | Townsend | 370/95.1 |
| 4,654,655 | 3/1987 | Kowalski | 370/85.6 |
| 4,677,656 | 6/1987 | Burke et al. | 379/58 |
| 4,680,787 | 7/1987 | Marry | 379/63 |
| 4,972,432 | 11/1990 | Wilson et al. | 375/7 |
| 5,081,641 | 1/1992 | Kotzin et al. | 370/85.1 |

Primary Examiner—Douglas W. Olms
Assistant Examiner—Min Jung
Attorney, Agent, or Firm—Raymond A. Jenski; Daniel W. Juffernbruch

[57] ABSTRACT

Data transfer apparatus (211,213) for a radiotelephone peripheral using a time multiplexed data bus for communication with a bus master of the radiotelephone couples peripheral devices external to the radiotelephone and other user information inputting devices, such as a handset for a cellular mobile radiotelephone, to the radiotelephone's central processor and speech processor. The data transfer apparatus generates time slots in frame formats in which the information is sent over the data bus. The entire message, information bits and the header, sent in a time slot from a peripheral device to the bus master is used to determine bus contention. Bus contention resolution during the start-up of data bus operation sets the priority with respect to other data transfer apparati with which a peripheral device's data transfer apparatus is able to access the bus during normal operation.

23 Claims, 16 Drawing Sheets

DATA TRANSFER METHOD AND APPARATUS FOR COMMUNICATION BETWEEN A PERIPHERAL AND A MASTER

BACKGROUND OF THE INVENTION

The present invention relates generally to digital data and analog voice transmissions in a radiotelephone unit. More particularly, the present invention relates to the conveyance of analog voice messages by a high speed data bus between subsystems of a cellular radiotelephone and the resolving of bus contention and bus collisions. The present invention is related to U.S. Patent Application Ser. No. 07/732,972, "Prioritized Data Transfer Method and Apparatus for a Radiotelephone Peripheral" filed in behalf of Smolinske et al. on the same date herewith and assigned to the same assignee.

A communication system which transmits information between two locations includes a transmitter and a receiver interconnected by a transmission channel. An information signal (which contains information, for example, an analog voice message) is transmitted by the transmitter upon the transmission channel to the receiver which receives the transmitted information signal.

Transmitters and receivers may be contained in a single apparatus so that the apparatus may both transmit and receive communications over radio-frequency channels. Cellular radiotelephones contain such transmitters and receivers together called transceivers.

The signal to be modulated may be an analog information signal (for example, a voice message) or a digital information signal (for example, an already digitized message). When the signal to be modulated is an analog signal, separate hardware signal lines are used to carry the analog signals and digital signals to the point in the transmitter where the signals are modulated. Signals are input to a cellular radiotelephone at the user interface portion of a cellular radiotelephone. Generally, devices such as microphones, keypads, or other means for inputting information signals into the radiotelephone may be contained in the user interface portion of a cellular radiotelephone, or other external devices, such as facsimile machines or external handsets, can be connected to input information to the cellular radiotelephone through a user interface to the cellular radiotelephone.

The receiver of a radio communication system which receives the modulated information signal from electromagnetic energy contains circuitry to detect, or to otherwise recreate, the information signal modulated upon the carrier signal. The process of detecting or recreating the information signal from the modulated signal is referred to as demodulation, and such circuitry for performing the demodulation is referred to as demodulation circuitry. The circuitry of the receiver is constructed to detect, and to demodulate modulated signals which have been previously modulated by a transmitter modulator.

Subsequent to demodulation, the original signal input by the user may be reconstructed, generally, after further processing of the demodulated signal is done to eliminate noise added in the transmission of the signal over the radio-frequency channel. The reconstructed signal is then output at the user interface on the receiver side of the radio system where devices such as speakers, displays, or facsimile machines may be interfaced to the radio system.

Conventional cellular radiotelephone systems require the transmitter and receiver to operate simultaneously on different radio frequencies. The signals modulated by the conventional cellular radiotelephone transmitter and demodulated by the receiver are kept separate from each other in the cellular radiotelephone unit. Newer cellular radiotelephone systems do not require the transmitter and receiver to operate simultaneously on different frequencies.

In prior cellular radiotelephone units, analog information signals were modulated and transmitted along with digital information signals, therefore, separate parallel hardware paths were generally necessary to carry the analog signals and digital signals to the modulation circuitry in order to transmit the signals. Moreover, in general, cellular radiotelephones processed analog signals as well as digital data information. The processing and transmission of the analog signals within a conventional cellular radiotelephone required additional hardware in the form of hardware signal lines and signalling hardware devices that were separate from the digital data signal lines to convey the analog signals through the cellular radiotelephone from user interface portions of radiotelephones to the transceiver. Thus, cellular radiotelephones have parallel hardware paths for analog signals and digital data signals from the user interface portion of the cellular radiotelephones to the central signal processing portion of the radiotelephones where the analog signals may be processed and digital signals properly formatted for modulation and transmission. Because a decrease in the size of radiotelephones is a desirable goal in cellular radiotelephone technology, minimization of excess hardware requires that parallel paths, such as the one between the user interface portion of a radiotelephone and the central signal processing portion, be avoided wherever possible in order to decrease the size of cellular radiotelephones.

Examples of serial digital data buses which are presently used in parallel hardware paths with analog signals may be found in a synchronous self-clocking digital data transmission system described in U.S. Pat. No. 4,369,516 to Byrns, a synchronous/asynchronous data bus system described in U.S. Pat. No. 4,972,432 to Wilson, a radiotelephone peripheral bus system described in U.S. Pat. No. 4,680,787 to Marry; and in U.S. Pat. No. 5,060,264, "Radiotelephone Controller Configured for Coresident Secure and Nonsecure Modes" to Mueller et al.

The synchronous/asynchronous data bus, U.S. Pat. No. 4,972,432, described a asynchronous data transmission system layered on a slower self-clocking synchronous transmission system. The asynchronous data transmission system had much faster data transfer capability than the synchronous data transmission system described in U.S. Pat. No. 4,369,516 to Byrns. This was a particularly important characteristic when trying to integrate the functions of a portable radiotelephone with a mobile type radiotelephone peripheral to take advantage of superior mobile type characteristics, such as power output, using a minimal amount of time for the required transfer of data. An example of a mobile type radiotelephone peripheral is described in U.S. Pat. No. 4,680,787 "Portable Radiotelephone Vehicular Converter and Remote Handset", a CVC, to Marry. This integration was accomplished by splitting radiotelephone functions between the CVC peripheral and the portable radiotelephone. User variable functions allocated to the CVC and radio functions, like call processing, were left in the portable. This required a much faster transfer of information over the cellular radiotelephone data bus in order to integrate radiotelephone functions and information between the portable radiotelephone and the CVC peripheral than possible with the synchronous data transmission invention described in U.S. Pat. No. 4,369,516 to Byrns, and the synchronous/asynchronous data transmission system, U.S. Pat. No. 4,972,432 to Wilson, met the requirement of providing greater speed for the transfer of data between the radiotelephone unit and peripheral.

Currently, there is an even greater demand for faster data transfer in cellular radiotelephones because the increased number of users on present cellular systems have strained cellular system capacity. Cellular systems require more efficient use of the resources available for cellular systems.

One manner in which cellular system capacity could be used more efficiently is to send more messages within a given period of time. This could be accomplished by digitizing all messages sent on the cellular system by cellular radiotelephones, and then sending the modulated digital messages sequentially to the individual cellular radiotelephones operating on the system. Moreover, digitizing all messages would also enable cellular systems to use the cellular system radio-frequency spectrum more efficiently because digitized analog messages use less of the radio-frequency spectrum than analog voice messages. Therefore, more digitized voice messages could be sent over a portion of the radio-frequency spectrum than the equivalent analog voice messages. One manner of doing this is to digitize the messages at the user interface to the cellular radiotelephone, and then send the messages to the central processing portion in the radiotelephone transceiver on a high speed data bus, and then to the modulation point in the transmitter. Analog messages, particularly analog voice messages, could not be digitized and sent on data buses previously used in cellular radiotelephones because the data buses were not fast enough to adequately send digitized analog voice messages, that were digitized in a real time manner, from the user interface to the transceiver portion of the cellular radiotelephone. For this reason a higher speed data bus for cellular radiotelephones is necessary.

Moreover, much higher capacity systems, such as the time division multiple access (TDMA) systems, are forcing current generation cellular radiotelephone units to process digital data and analog signals at much higher rates and to be more flexible in handling data than the aforementioned data transmission systems. In TDMA cellular radiotelephone systems, it is generally desirable that analog voice messages, which come from the user input into the radiotelephone in a continuous manner, take priority over digital data or digital control messages because the continuous nature of voice messages dictates constant sampling of the input while a voice message is being input, e.g., at a radiotelephone microphone, otherwise there will be gaps in the voice message; on the other hand, digital data coming into the radiotelephone unit is already in a form such that continuous sampling is not required because errors in routine digital data messages can be readily detected and messages can be stored and retrieved from storage and resent if an error is detected. Thus it would be desirable if a high speed cellular radiotelephone data bus accommodated analog voice messages input at the radiotelephone user interface in a real time manner, without interruption, as well as already digitized messages.

Not only are minimization of hardware and increased data transfer speed important considerations for eliminating analog signals from cellular radiotelephones, but conversion, transmission, and storage of analog voice message signals in digital form gives the cellular radiotelephone (and cellular system as well) greater flexibility and quality because once the message is in a digitally-represented form it can be stored, processed, and retrieved in a manner whereby the signal is not lost or subject to the type of signal degradation that occurs in processing, transmitting, and receiving analog signals.

Therefore, it would be desirable to provide a high speed data bus for a cellular radiotelephone that transmits data fast enough to allow the cellular radiotelephone to function in a cellular system that has greater message throughput than current cellular systems (such as a TDMA cellular system). It would also be desirable if the high speed data bus were fast enough to allow a reduction of the number of analog and digital data signals paths in the cellular radiotelephone by digitizing the analog voice message signals at the user interface portion of the cellular radiotelephone such that the same signal paths could be used to carry digital data messages as well as the digitized analog signals to other subsystems of the cellular radiotelephone as well as to peripheral devices which might be used with the cellular radiotelephone. It would also be desirable if the transmission of digital data transmitted over the high speed data bus did not cause a degradation of the digitized voice messages in a cellular radiotelephone. It would also be desirable if the data bus system were able to allocate the bus dynamically so that multiple peripheral devices, such as multiple voice peripherals or facsimile machines, could use the radiotelephone in order to more efficiently use the cellular radiotelephone and the cellular system.

SUMMARY OF THE INVENTION

The present invention encompasses a data transfer apparatus for a radiotelephone peripheral which uses a time multiplexed data bus for communication with a master unit. A contention determining field is generated from a priority bit generator, a register select bit generator, and a source address bit generator. A plurality of data bits are accepted and assembled with the contention determining field for transmission in one time slot on the time multiplexed data bus.

DETAILED DESCRIPTION OF A PREFERRED EMBODIMENT

Figure 1:
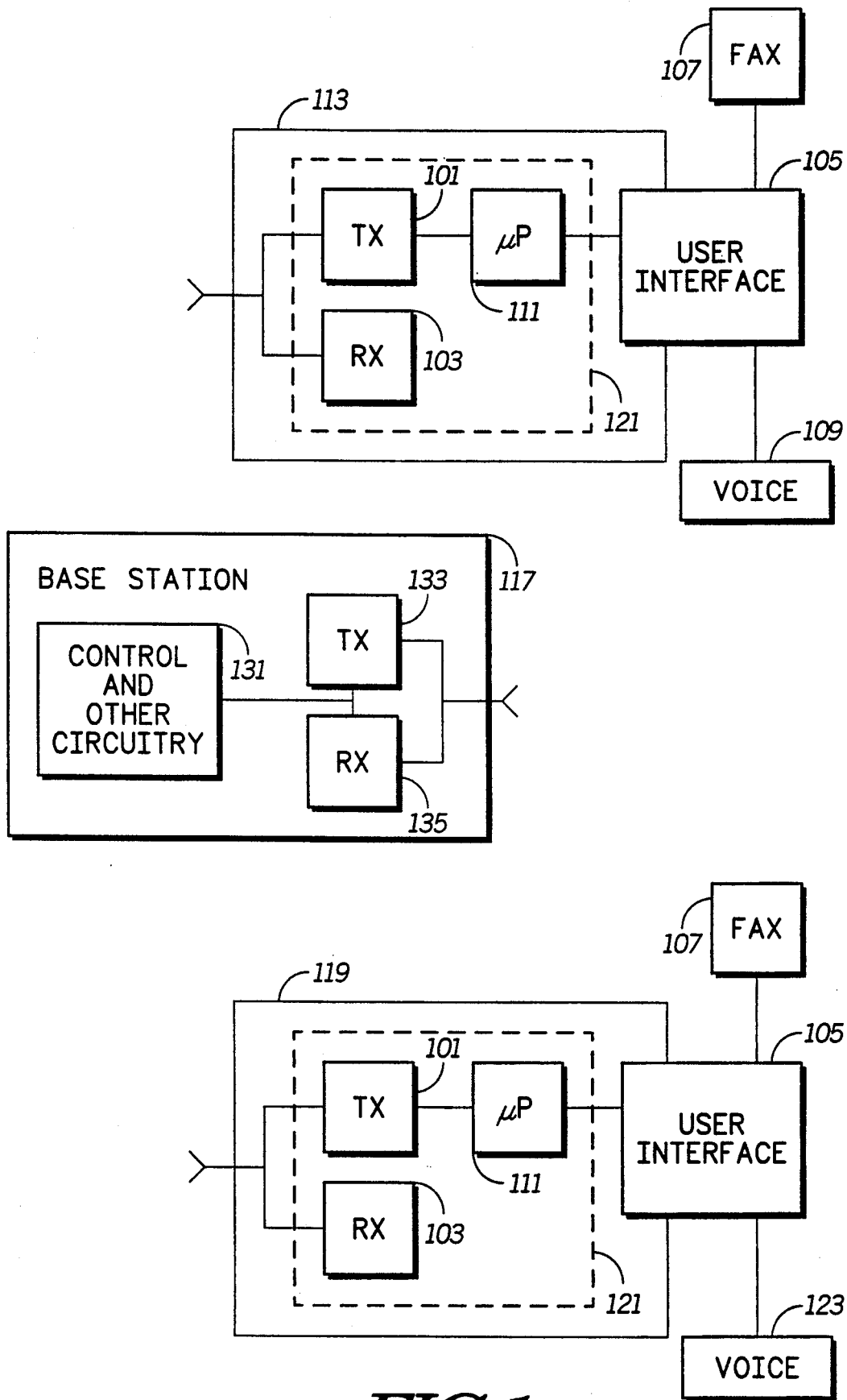
FIG. 1 is a block diagram of a cellular system utilizing cellular radiotelephones which may employ the present invention.

In order to accomplish the aforementioned needs, analog signal messages, in particular analog voice signal messages (which require real time sampling and processing not realizable on data buses previously incorporated in radiotelephones), are digitized at the user interface of a radiotelephone and then transmitted to the central processor portion fast enough to meet the sampling and processing requirements of such real time messages. Messages transmitted to the central radio processor for processing are flow controlled, a determination that said message is a data message, and messages transmitted to the speech processor of the radiotelephone are not flow controlled, thereby enhancing the real time processing capability for digitized analog voice messages.

A time slotted data bus in which all the time slots are contained within a frame is employed. Messages are sent within the individual time slots of a frame. Time slots may be allocated to individual peripheral devices for each frame, or several peripheral devices may time multiplex over the same time slot. Each frame contains at least one general use time slot which can be used for messages other than digitized analog voice messages.

The data transfer apparatus can be used either to receive messages sent to it over the data bus or to transmit messages over the data bus.

The data transfer apparatus creates two different message formats, one for messages to peripheral devices from the bus master (downlink messages), and another for messages from the peripheral devices to the bus master (uplink messages). During the data bus start-up procedure, data bus contention is resolved by information which reaches the data bus as the fourth of four fields (data bit field) contained in the uplink messages; this information is retrieved from a memory device. In the case of uplink messages after the start-up procedure has been executed, bus contention is resolved by the information contained in the first three of the four fields comprising the message format.

The data transfer apparatus can receive uplink messages at more than one input port. One of the input ports is for inputting digitized analog voice messages and also for inputting information (retrieved from a memory device) used during the data bus start-up to determine the address with which data transfer apparati connected to the high speed data bus will be able to access the high speed data bus. The other port is used to input digital data messages and messages of the highest priority. Messages are routed, and priority and bus contention are determined, by the input port the messages use to enter the data transfer apparatus. In order to operate at the high speed required to sample and process digitized analog voice messages, and also accept digital data messages at the other input port, the data transfer apparatus has internal devices which are able to receive information in bit form from other devices and to create a 48 bit data field from the received information. All messages sent over the data bus contain 48 bit data fields. In addition, 16 bits (the header) are used for message handling information, included among these 16 bits are a priority field, a register select field, and a field designating the address of the device originating the message. These 16 bits are created within the data transfer apparatus in different locations and are routed differently over the data bus, depending on the type of message, i.e., voice, non-voice, highest priority message, or start-up procedure message. The messages are coded before being sent over the data bus, and the coded message is also used to determine bus contention when several devices are connected to the data bus.

The data transfer apparatus is also able to receive messages sent to it over the data bus. The data transfer apparatus determines the appropriate output location for the message sent to the data transfer apparatus according to the 16 bit header information. The received messages can be routed to the same devices which comprise the two input ports mentioned above, depending on what the message type is, i.e., voice, non-voice, highest priority message, or a start-up procedure message.

One application which may advantageously employ the present invention is that of a cellular radiotelephone in which a minimum number of signal lines, and associated radiotelephone hardware, aids in the miniaturization of the radiotelephone equipment. Although the invention is described with radiotelephones as the preferred embodiment, the invention may just as well be employed in other applications having similar requirements or requirements necessitating interconnection with equipment employing the present invention.

In the preferred embodiment, all information input to a radiotelephone is digitized at the user interface portion of the radiotelephone, so that analog signals are no longer transmitted among the subsystems of a radiotelephone, nor are analog signals directly modulated for transmission over the radio-frequency channels used by a cellular radiotelephone system. Radio-frequency spectrum is conserved because digitized information signals are able to carry equivalent information as non-digitized signals in a smaller portion of the radio-frequency spectrum. Accordingly, the present invention could be used in conjunction with a system such as TDMA cellular system so that radio-frequency spectrum is used more efficiently. Moreover, digitizing all messages at the user interface portion (or within peripheral devices connected to the radiotelephone over the data bus) reduces the number of signal lines used to interconnect different sub-systems of the radiotelephone. This corresponds to a reduction of hardware requirements, an important factor in reducing the size of radiotelephones. Additionally, the present invention is fast enough to provide for simultaneous connection, and operation, of several peripheral communication devices, voice and non-voice, to the radiotelephone.

Cellular radiotelephones provide the same type of fully automatic service to a mobile or portable radiotelephone user that is provided to a conventional land line telephone subscriber. In a cellular radiotelephone system, service is provided over a wide geographic area by dividing the area into a number of cells. In a conventional cellular system, each cell typically has a base station, which provides a signalling radio channel and a number of radiotelephone voice channels. A base station contains one or more receivers 135 and transmitters 133, as well as control and other circuitry 131 to operate the base station 117. Telephone calls are placed to, and originated by, radiotelephones over the signalling channel in each of the cells. A general representation of a cell in the system is depicted in FIG. 1. Depicted in FIG. 1 are a remote radiotelephone unit 113 controlled by cell base station 117 through which the radiotelephone unit 113 may communicate with second remote radiotelephone unit 119 within the cell controlled by the base station 117. Each radiotelephone within the cell typically has both a transmitter 101 and a receiver 103 portions as well as a user interface portion 105 where the radiotelephone user may input information into the transmitter 101 after necessary signal processing in a central signal processing portion 111. This central signal processing portion 111 contains the central computing processor for the radiotelephone and is generally located in the portion 121 of the radiotelephone which contains the transmitter 101 and receiver 103. In a conventional system, upon completion of the signalling, the radiotelephone is assigned a radio voice channel to which it switches from the radio signalling channel for the duration of the call. In the event that a radiotelephone leaves the cell and enters another cell, the radiotelephone is automatically switched over, or handed off, to an available voice channel in the new cell.

The system of the preferred embodiment has been designed to operate in a cellular remote radiotelephone unit that will operate in a time division multiple access system (TDMA), although it could be used in any automatic radiotelephone system. A conventional radiotelephone sends information signals among the different functional blocks that make up the radiotelephone as well as to peripheral devices connected to the radiotelephone. In a conventional telephone, analog signals and digital signals are routed from the portion of the radiotelephone where the signals are input into the radiotelephone to other functional blocks in the radiotelephone.

For example, in a conventional radiotelephone, a user will speak into the microphone input of a cellular radiotelephone, and then the analog signal (voice message input) will be routed on analog signal lines to the transmitter modulator, where the analog voice message signal will be modulated and subsequently transmitted out. This analog signal is transmitted through the cellular radiotelephone system to a radiotelephone receiver which receives the analog voice message input. Thus in order to get the analog voice information into the cellular radiotelephone system, two analog signal lines are required.

On the other hand, a digital signal input, for example a keypad press used to dial a user telephone number, will be routed on different signal lines, and be processed by the central radio processor before it is sent to the transmitter to be modulated and transmitted out to the cellular radiotelephone system. Thus, this digital signal transmission to and through the cellular radiotelephone system requires additional hardware signal lines to send the information from the keypad press device to the transmitter in order to send the information through and to the cellular radiotelephone system. Moreover, in a conventional radiotelephone there are separate lines for analog voice messages and digital signals that are to be sent to and through the cellular radiotelephone system from the user interface/input portion of the radiotelephone to other portions of the radiotelephone. A radiotelephone unit system employing the present invention has the need for separate signal lines to carry information from the user interface portion of the radiotelephone to other portions of the radiotelephone eliminated by the digitizing of all analog voice messages input to the radiotelephone at the user interface of the radiotelephone, and the sending of digitized analog voice samples to the central radio processor portion of a radiotelephone. This radiotelephone unit accommodates digital data messages as well, and allows the digitized analog voice samples to be processed fast enough to ensure the digitized analog voice are of good audible quality when recovered by a radiotelephone receiver and reconstructed for use by a user of a cellular radiotelephone system.

The preferred embodiment of the present invention employs a time slotted data bus for sending digital data messages and digitized analog voice messages between the user interface portion and other function blocks of a radiotelephone (including peripheral devices which may be attached to the cellular radiotelephone).

Figure 3:
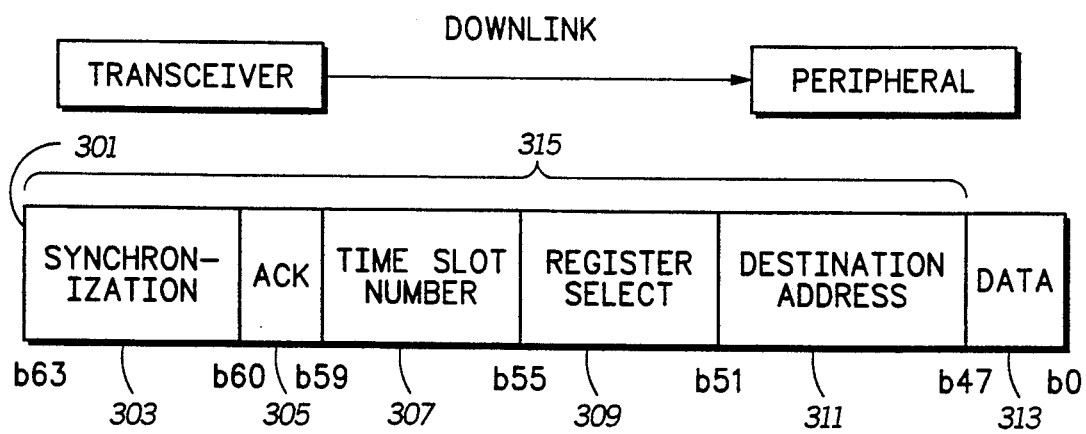
FIG. 3 is a bit diagram of the format for a message sent from a bus master to a device on the data bus of a cellular radiotelephone.
Figure 4:
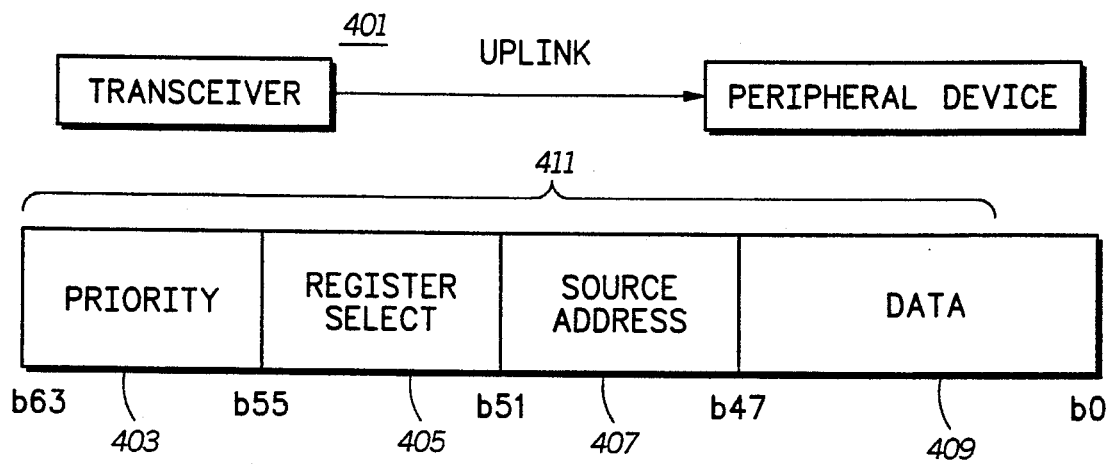
FIG. 4 is a bit diagram of the format for a message sent from a device on the data bus to the bus master.
Figure 6:
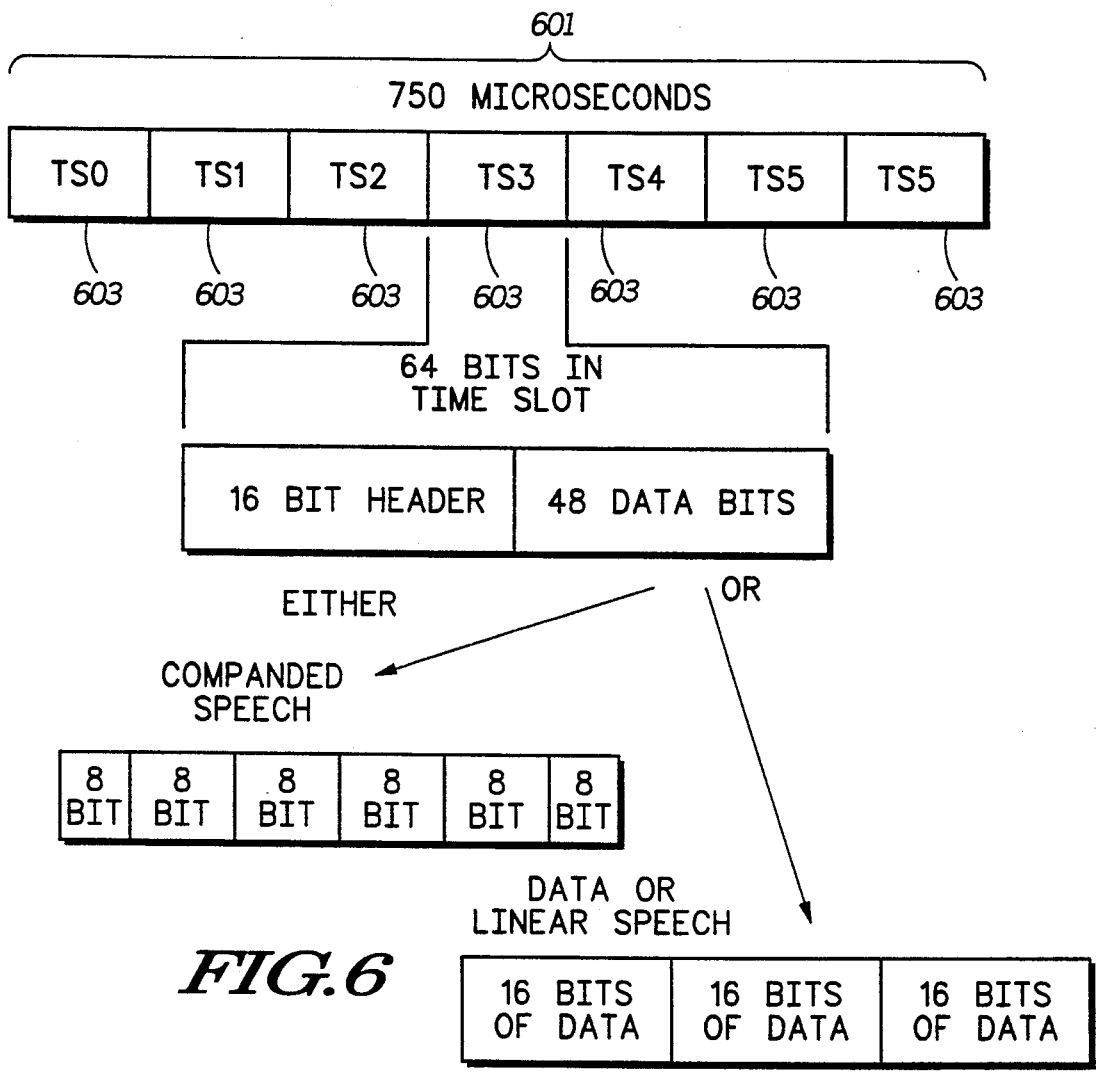
FIG. 6 is a diagram depicting the relationship between the individual data timeslots of the data bus protocol of the present invention.

The time slotted data bus, as depicted in the format of FIG. 6 employs six time slots 603 sent over a period of 750 microseconds, called a frame 601. Each time slot is formatted as shown in FIG. 3 and FIG. 4. The data bus utilizes two unidirectional transmissions, from the "bus master" (the central processor 111 in the radiotelephone 113) to other devices with data transfer apparatus to accept messages, or from other devices to the bus master or to other devices. Messages are defined to be either downlink messages which have a message format as shown in FIG. 3, or uplink messages which have a format as shown in FIG. 4. The downlink messages are messages sent from the central signal processing and computing portion (The bus master 111 or 205 is contained in this portion of the radiotelephone unit) 207 of the radiotelephone (In the case of a mobile radiotelephone, this portion is contained with the transceiver in a single unit 201 connected to a user interface unit 203, e.g., a handset.) to other portions of the radiotelephone such as the user interface portion 203 of the radiotelephone, or to peripheral devices which may be connected to the central signal processing and computing portions 205 of the radiotelephone.

Referring to FIG. 3, downlink messages provide a format of six fields: a Synchronization Field 303; an Acknowledgement (Ack) Field 305; a Time Slot Number Field 307 which is also used by peripheral devices to synchronize the time slots in a frame; a Register Select Field 309 used to select a particular register within the addressed data transfer apparatus device; a Destination Address Field 311 used to specify the device connected over the high speed data bus which is being addressed by the bus master; and a Data Field 313 used to send information which will be used by the addressed peripheral device. The Synchronization Field 303 is used to control time alignment on both the uplink and the downlink messages and is sent at the beginning of every downlink time slot.

Uplink messages are messages sent to the central signal processing and computing portions 201 of the radiotelephone from other portions of the radiotelephone, or from peripheral devices attached to the radiotelephone, over the present invention.

As shown in FIG. 4., the uplink message format provides four fields, it has an eight bit Priority Field 403, a four bit Register Select Field 405, a four bit Source Address Field 407, and a forty-eight bit Data Field 409. All of the fields, including the 48 bit data field, are used to determine bus contention among data transfer apparati which communicate with each other over the time slotted data bus. This is done by a sequential bit-by-bit comparison scheme in each data transfer apparatus beginning with the most significant bit in the 64 bit word (in the Priority Field portion of the word) and ending with the least significant bit (in the Data Field 409). Each 64 bit word is transmitted in a time slot of the data bus frame 601.

Additionally, unique time slots within the frame 601 of the data bus format are allocated by the present invention to peripheral devices which accept analog voice messages in order to transmit the digitized voice messages to the central speech processing device 223 (in the logic portion 207 of the radiotelephone 113, 119) at a rate to ensure that voice messages are adequately transmitted by the radiotelephone 113, 119 to the cellular system base station 117; peripheral devices means the user interface portion 105, 203 of a radiotelephone 113, 119 as well as peripheral devices externally connected to the radiotelephone, e.g., an external handset 109, a facsimile machine 107, or similar peripheral device 511.

As mentioned above, the data bus frame 601 in the preferred embodiment is 750 microseconds, there are six time slots per frame 601, and forty-eight data bits per time slot, therefore, the throughput of data bits by the present invention is three hundred eighty four thousand bits per second. If the non-data bits are accounted for, the total throughput is based on sixty-four bits per time slot and the present invention has a total throughput of five hundred twelve thousand bits per second. In either instance, this throughput is an order of magnitude faster than that generally available in conventional cellular radiotelephones. This throughput is important because it is much higher than conventional data buses found in current cellular radiotelephones. This throughput is necessary in order that peripheral devices such as a handset for mobile radiotelephones can contain digitizing devices (coder-encoder "codec" 213) and the data transfer apparatus 211 can transfer this digitized information to the main radiotelephone processor 205 fast enough for processing and storage without a loss of digitized analog voice message information.

Figure 2:
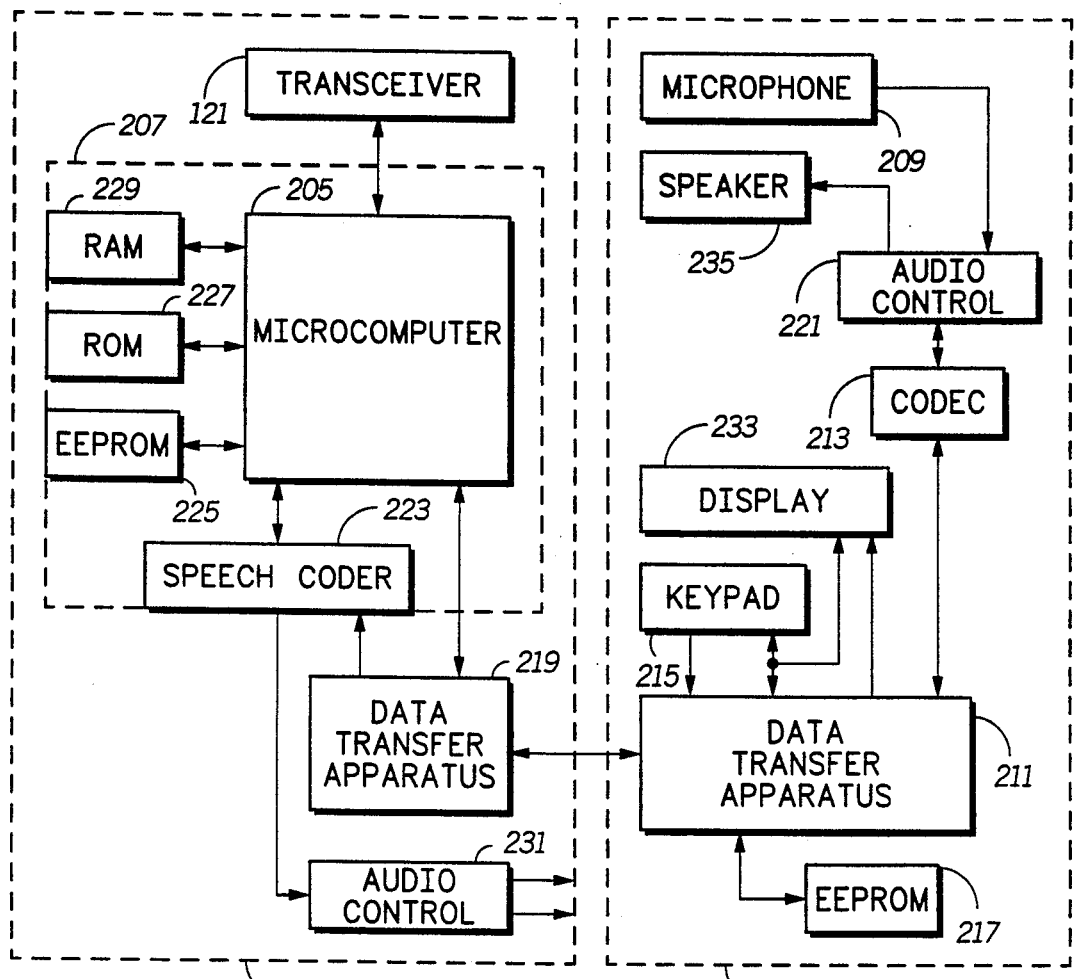
FIG. 2 is a diagram depicting two principal portions of a cellular radiotelephone which may utilize a high speed data bus to communicate with each other.

In order to accommodate receiving and processing information signals over the radio frequency link between the base station 117 and radiotelephone 113, 119 and from the user interface portion 105 of the radiotelephone, the data bus is used in a radiotelephone architecture as shown in FIG. 2. In this architecture, analog voice messages may be input at the microphone 209, further processed as an analog signal by the audio control circuitry 221 of the radiotelephone, before being digitized by the coder-decoder 213 which provides for the digital-to-analog and analog-to-digital conversion of speech or other analog signals. The codec 213 converts the received analog voice message signals to a stream of binary bits and can be used to reconvert stored binary bits to a replica of the original analog signals, such as synthesized speech signals.

After the codec 213 has digitized the analog signals into digital messages, it then transmits them to the data transfer apparatus 211 where the digitized analog message is sequentially shifted bit-by-bit into a 64 bit register within the data transfer apparatus. In the case where the codec 213 is a companded codec, six 8 bit frames as shown in FIG. 6 are sequentially shifted into the 64 bit register (only 48 bits are data, the other 16 bits are control bits for the time slot) within the data transfer apparatus from the codec 213. In the case of a linear codec, which takes larger samples and does not compress data, three 16 bit codec frames are sequentially shifted into the 64 bit register as shown in FIG. 6. The method described in the preferred embodiment is not limited to codecs with these conversion rates. If a higher rate of information processing is necessary, the frame time period can be shortened accordingly, and higher conversion rate codecs could be used in place of the companded and linear codec devices. The introduction of the codec at the user interface portion 203 (for example a mobile radiotelephone handset is such a user interface) of the cellular radiotelephone is an improvement over previous cellular radiotelephone designs, because by being able to throughput data at the rates that it does, it is able to process digitized analog voice messages which require a much higher access (sampling) rate than that allowed by previous data buses used to connect the user interface portion 203 of a radiotelephone to the main processor 205 of the radiotelephone, as a result this bus eliminates the need to supply separate analog signal lines and related hardware to carry analog speech signals to the cellular radiotelephone's processing portion from the user interface portion 203 of the cellular radiotelephone. For example, a companded codec operating at an 8 KHz rate requires a 64 Kbps data rate. The system of the preferred embodiment is able to accomplish, and furthermore, to accommodate five user interface (or other peripheral devices used to input voice messages to a radiotelephone) devices with such data transfer apparati. Furthermore, because the system allows all analog voice messages to be digitized and sent over a digital data bus, it reduces the number of signal lines required to connect the user interface (handset portion) portion of the cellular radiotelephone from eight lines to four which is an important factor in being able to down size radiotelephone equipment.

Flow control bits and other format bits are added to the 48 bits shifted into the 64 bit register to comprise a bus format as depicted in FIG. 4 for messages that are sent to the central processing portion of the radiotelephone, which functions as the bus master, from other devices which may access the serial data bus.

Peripheral devices and the bus master (the central radiotelephone processor) interconnected over the high speed data bus require the data transfer apparatus 211, 219 in order to: properly format data bits of digital data messages and digitized analog messages transmitted over the high speed data bus; be assigned time slots for transmitting over the high speed data bus; determine bus contention over the high speed bus; and to receive messages from the bus master. The data transfer apparatus 211, 219 can be used and configured for use on the bus master side of the data bus or the peripheral device side of the data bus. The data transfer apparatus 211, 219 can be used to receive or transmit messages over the data bus and it can process digital data messages or digitized analog voice messages.

Figure 5:
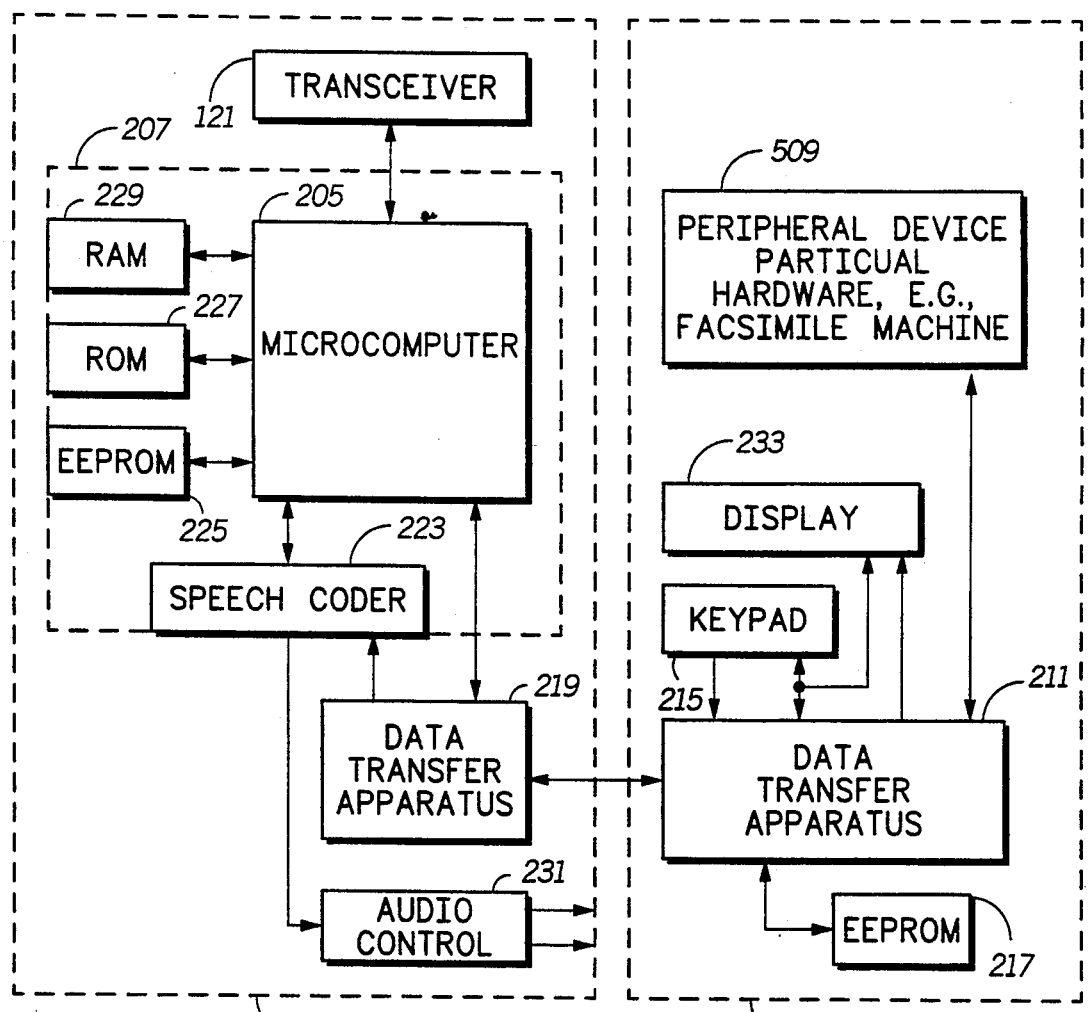
FIG. 5 is a diagram of a cellular radiotelephone interconnected by the data bus to an external peripheral apparatus.

For example, in the case of analog voice messages input to a peripheral device such as a handset, the data transfer apparatus 211 in a peripheral device allows the radiotelephone data bus to accept an analog voice message from a peripheral device 203 such as a handset as depicted in FIG. 2 after the analog voice message has been digitized by using an appropriate means such as a coder-encoder (Other types of peripheral devices may also be used with the present invention, for instance FIG. 5 portrays a different device, such as a facsimile system 511, which may send information through the data transfer apparatus 211). The data transfer apparatus 211, 219 may then send the digitized analog message to the central processing portion 207 of the radiotelephone, or some other peripheral device connected to the high speed data bus.

Figure 7:
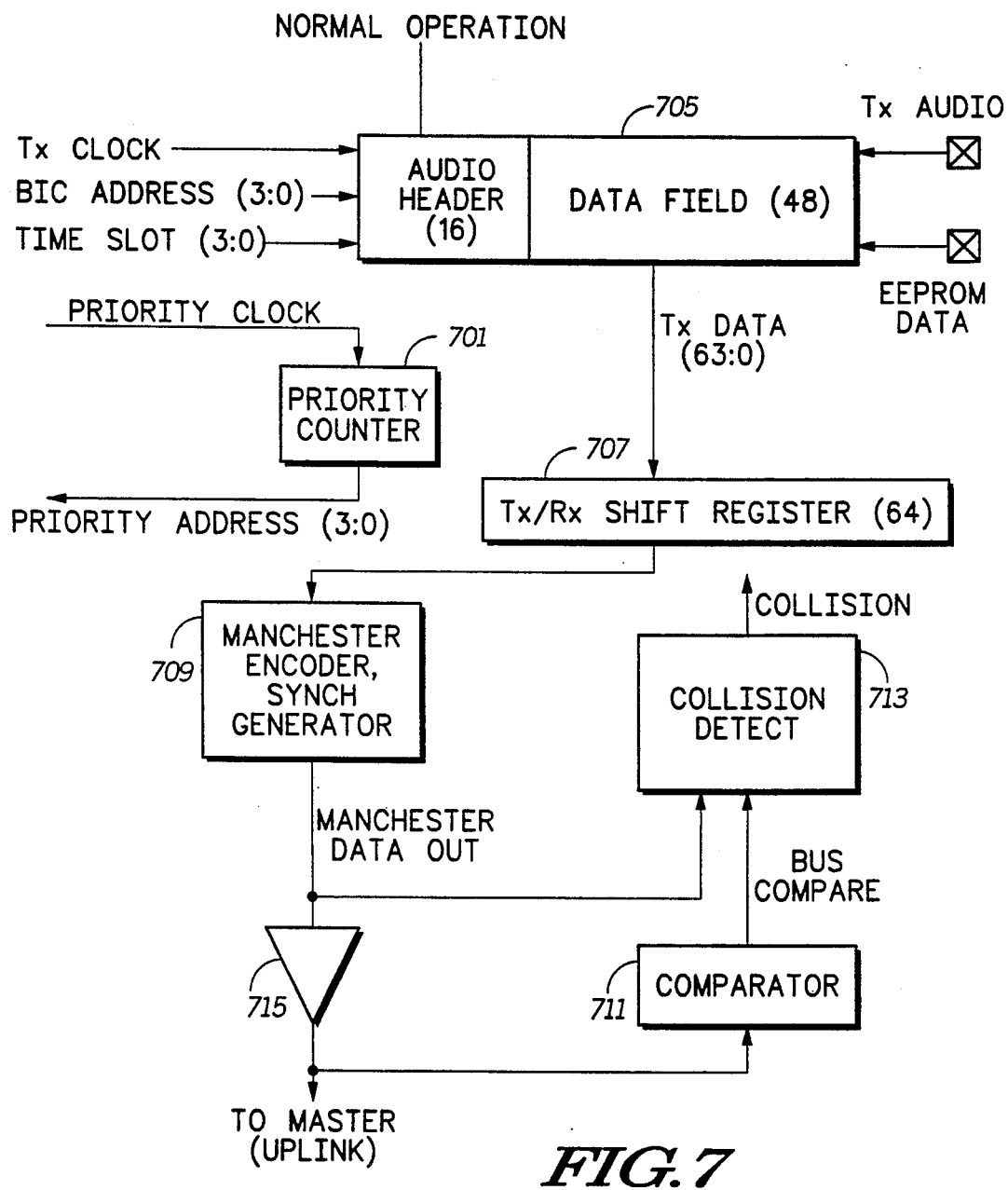
FIG. 7 is a block diagram depicting the apparatus within a device connected to the data bus used to determine bus contention with other devices connected to the data bus and the device address.
Figure 9:
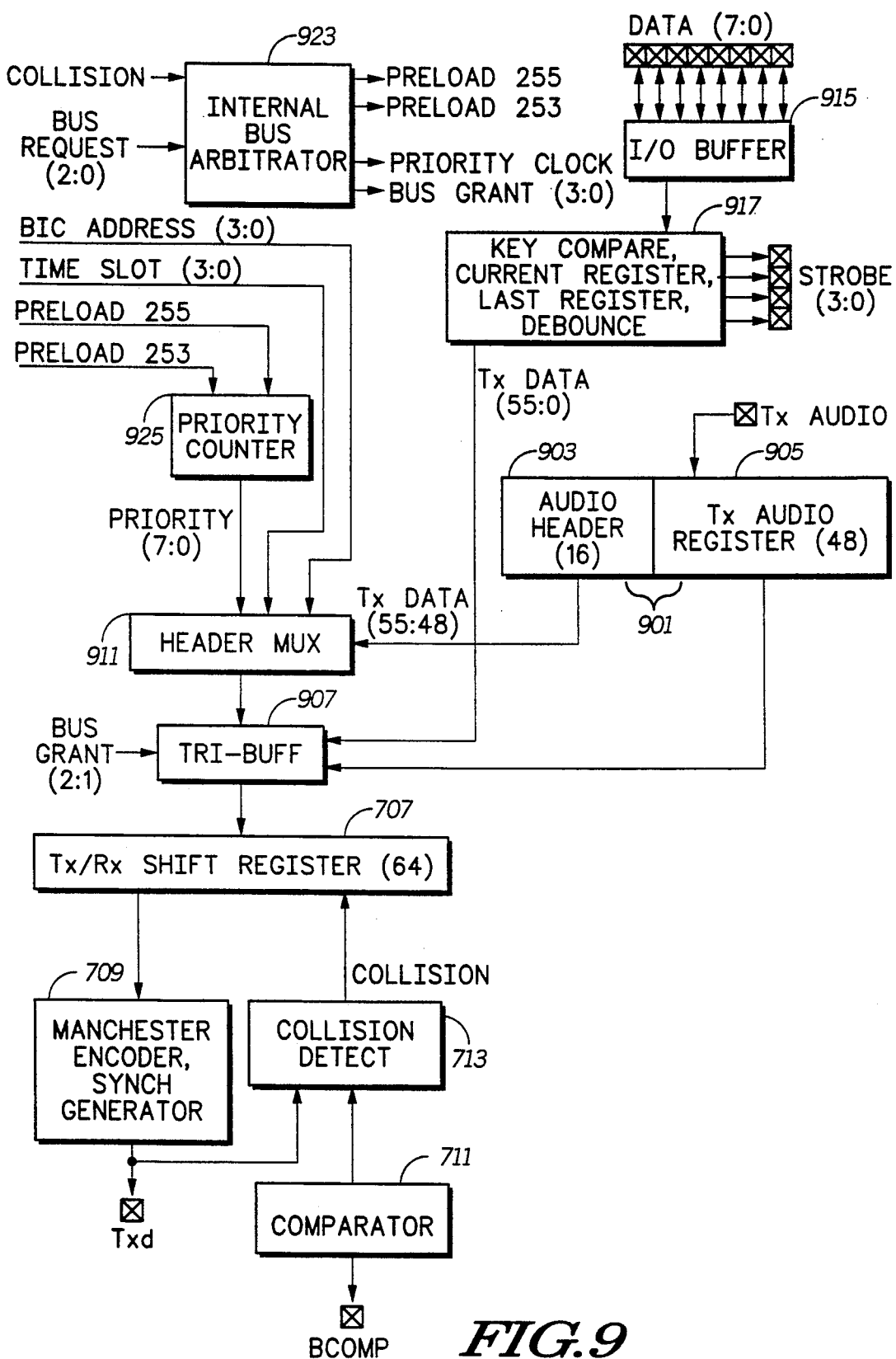
FIG. 9 is a diagram depicting the main data flow paths, formatting, and protocol handling mechanisms for digital data and digitized voice messages sent to the data bus for transmission to the transceiver portion of the radiotelephone or other peripheral devices.
Figure 10:
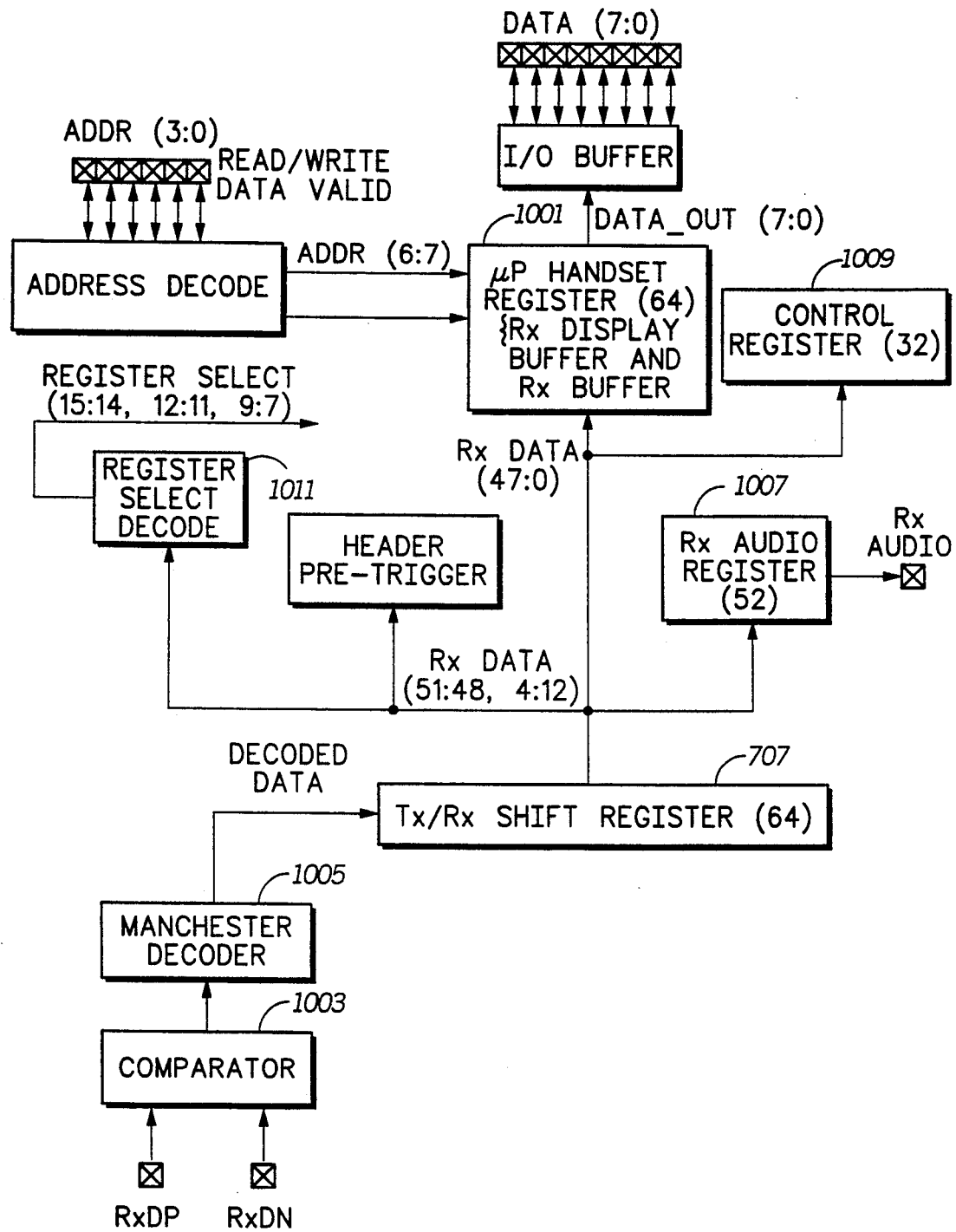
FIG. 10 is a block diagram depicting a peripheral device (and corresponding data flow) which may receive the digital data or digitized analog voice messages sent over the data bus from a transceiver portion of a cellular radiotelephone, or other peripheral device connected to the cellular radiotelephone user interface by the data bus.

The data transfer apparati 211, 219 contained in peripheral devices that communicate over the high speed data bus (either on the bus master side or peripheral device side of the data bus) is depicted in greater detail in FIG. 7, 9, and 10. The data transfer apparatus as depicted in FIG. 7, 9, and 10 is the same device whether it is on the bus master side 219 or on the peripheral device side 211 of the data bus. FIG. 7, 9, and 10 depict different operating conditions under which the present invention is used, and the variable operations performed by devices within the data transfer apparatus 211, 219 depending on the operations being performed by a data transfer apparatus, e.g., whether it is on the bus master side or peripheral device side of the data bus, whether it is used to transfer digitized voice messages or digital data messages, or whether it is used during start-up of data bus operation or after start-up of data bus operation.

The data transfer apparatus provides a mechanism to create a 64 bit word format which is used to send and receive digital data messages and digitized analog voice messages over the data bus. FIG. 7 is a block diagram depicting the mechanism used by the data transfer apparatus contained in a peripheral device to determine bus contention with other peripheral devices, also to determine the Peripheral Device address over the high speed data bus.

At the beginning of operation of the high speed data bus (start-up), the data transfer apparatus of each peripheral device assigns itself an address so that it can communicate with other devices connected over the high speed data bus. Because more than one device may be connected to the high speed data bus at start-up, it is necessary to resolve contention among, and between, the peripheral devices to be connected to the high speed data bus at start-up. In order to do this, the entire 64 bit word generated by the data transfer apparatus is used to determine bus contention.

In each peripheral device, at start-up, the first three fields are initialized to the following values in the Audio Header 903 portion of the Transmit Register 901 of FIG. 9, the Priority Field 403 (FIG. 4) is set to a value of 254, the Register Select Field 405 selects the processor register (register "C") in the bus master which is the same as Handset/μprocessor Register 1001 (FIG. 10) in a peripheral device, the Source Address Field 407 is set to zero by all the data transfer apparati 211 because no addresses are determined until the start-up procedure has been executed to determine the proper priority that should be given to peripheral devices that are connected to the data bus, and the Data Field 409 is used to determine bus contention when more than one peripheral device is connected to the data bus. Once such a bus contention is determined, the peripheral device which gains access to the bus assigns itself an address equal to the number of attempts required to gain bus access.

Figure 14A:
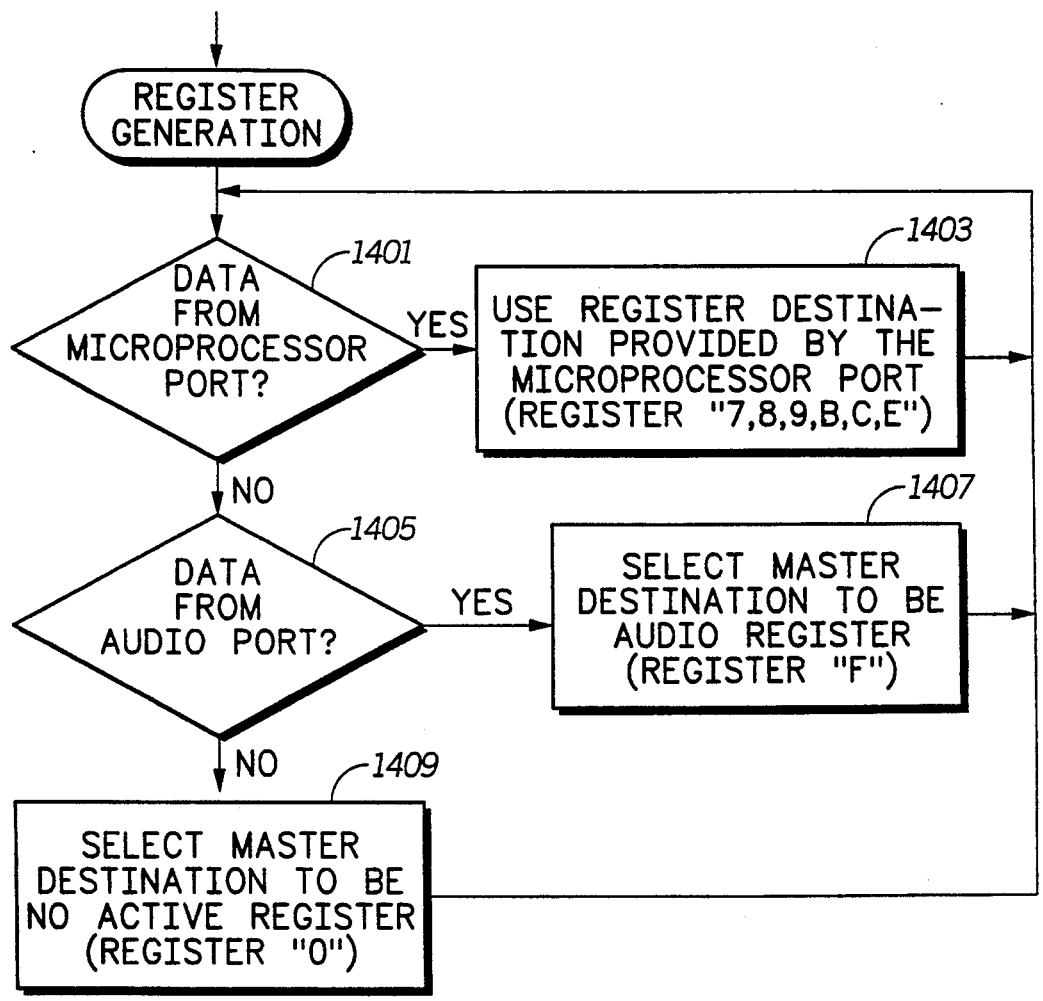
FIGS. 14A and 14B are flowcharts for the process of register selection in the master (FIG. 14A) and the peripheral (FIG. 14B).

The process by which the master selects a register field is shown in the flowchart of FIG. 14A. A determination is made, at 1401, whether the data is presented from the microprocessor port. If yes, the destination register generated by the microprocessor is used (at 1403) as the register field value. In the preferred embodiment, values 7, 8, 9, B, C, and E are used. If data is not from the microprocessor port, a determination is made, at 1405, whether data representing digitized audio is available from the Audio Port. If yes, the master destination is selected (at 1407) to be the Audio register (Register "F", in the preferred embodiment). If audio data is not present, the destination is selected (at 1409) to be a no active register (Register 0).

Figure 14B:
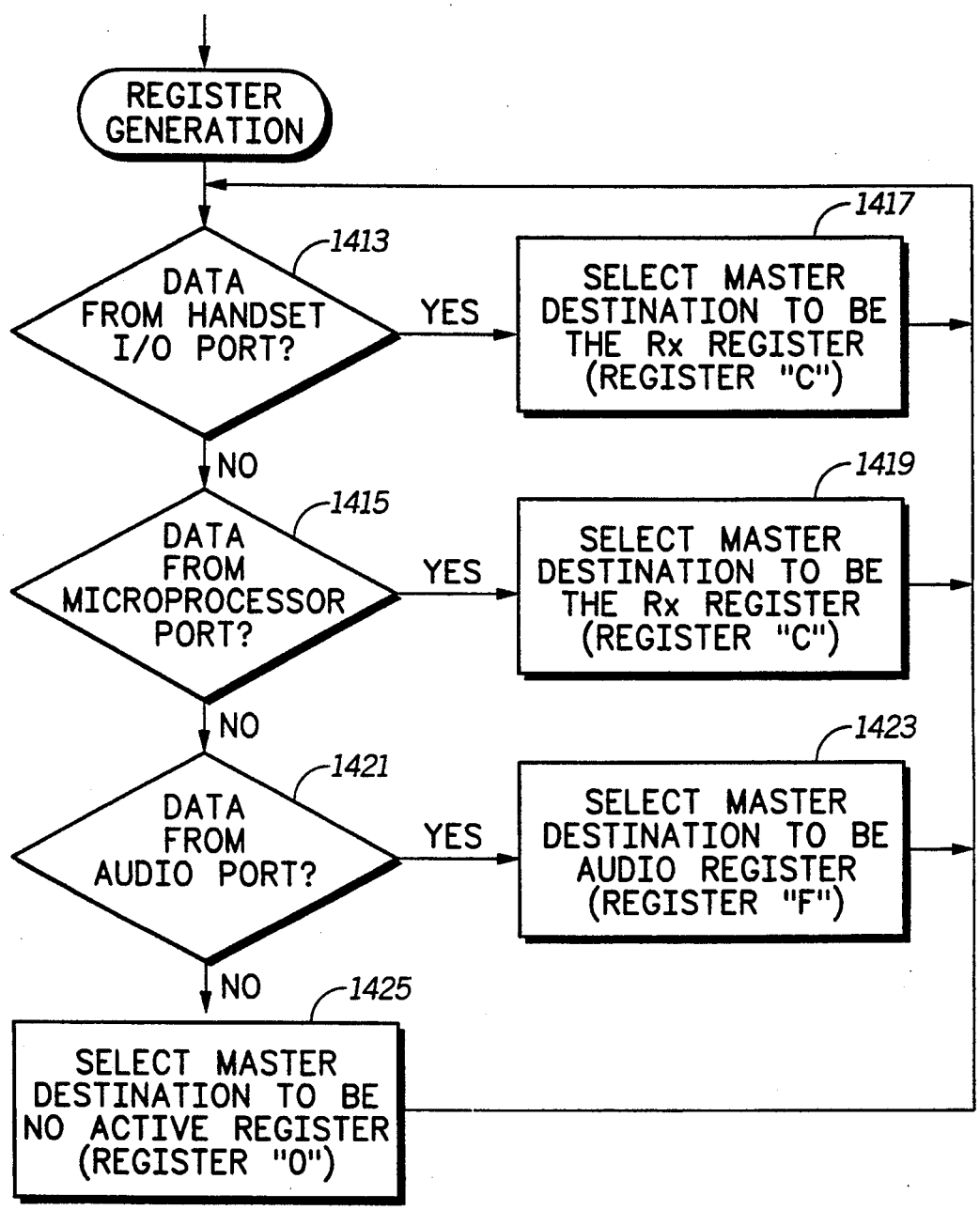

The peripheral selects a register by employing the process of FIG. 14B. A determination is made (at 1413 and 1415) whether data is present from the handset I/O port or the peripheral microprocessor port, respectively, and if it is, the master destination is selected (at 1417 and 1419, respectively) to be the Rx Register (Register "C"). If data is not found to be present, a determination (at 1421) of whether digitized audio data is present. If yes, the master destination is selected (at 1423) to be the Audio register (Register "F"); if no, the master destination is selected (at 1425) to be no active register (Register "0").

At start up, the data transfer apparatus 211 gets information from a device external to it, such as the EEPROM 217, in order to determine bus contention. The data transfer apparatus transmits this information serially to its Transmit Register 705 where the information is formatted into the 48 bit wide Data Field 409. The EEPROM 217 contains specific information about the peripheral device 203 that allows bus master microcomputer 205 to determine the peripheral device priority with respect to other peripheral devices attempting to access the high speed data bus. At start-up, the Priority Counter 701 in all data transfer apparati 211 attempting to access the bus is set to one.

The specific information contained in the EEPROM 217 within the peripheral device 203 is programmed so that the data transfer apparati 211 can compare (through the operation of the data bus) the value it has received from EEPROM 217 with the same specific information stored in EEPROMs of other peripheral devices when more than one device is connected to a cellular radiotelephone so that when there is bus contention, the peripheral device with the highest value number stored in its EEPROM 217 will gain access to the data bus. To perform the start up bus arbitration, the EEPROM data is transferred into the Transmit Register 705 of the data transfer apparati 211. The first three fields (16 bits) are initialized as previously described. Then the entire 64 bit word is transferred to the TX/RX Shift Register 707. After proper encoding (through the Manchester Encoder 709) of the bits sent to the Tx/Rx Shift Register 707, the data transfer apparatus 211 does a bit-by-bit comparison of the 16 bit header and the 48 bit data field through an Exclusive-Or gate in the Collision Detect circuit 713 with a signal (data bus state signal) derived from the Manchester Encoder 709 output (through buffer circuits) of the data transfer apparatus 211 wired to the Manchester Encoder outputs of other data transfer apparati attempting bus access. If the data bus state signal and the Manchester Encoder 709 output are not the same for any bit, then the output of the Exclusive-Or function and the Collision Detect 713 circuit is a logic "1" which indicates a collision on the bus has occurred and the data transfer apparatus which detects the "1" will not gain access to the bus. The data transfer apparatus which detects the "1" will stop its attempt to access the data bus and it will increment its Priority Counter 701 by value of 1. All data transfer apparati which do not detect a "1" will continue attempting to gain access to the data bus by continuing to shift Manchester encoded data bits and data bus state signal bits to the Collision Detect 713 circuit until only one data transfer apparatus has a zero output from the Collision Detect 713, this remaining data transfer apparatus will obtain access to the data bus and will assign itself the address equal to the value in its Priority Counter 701, which is one. The other data transfer apparati which failed to gain access will increment their Priority Counters 701 by one, and the same procedure outlined above in this paragraph will be followed until a second data transfer apparatus gains access to the data bus and assigns itself an address. This start-up procedure is repeated until each data transfer apparatus gains access to the bus and assigns itself an address. Each failed attempt to access the data bus results in the Priority Counter 701 incrementing itself by one in each peripheral data transfer apparatus which fails to gain access to the data bus.

Figure 15:
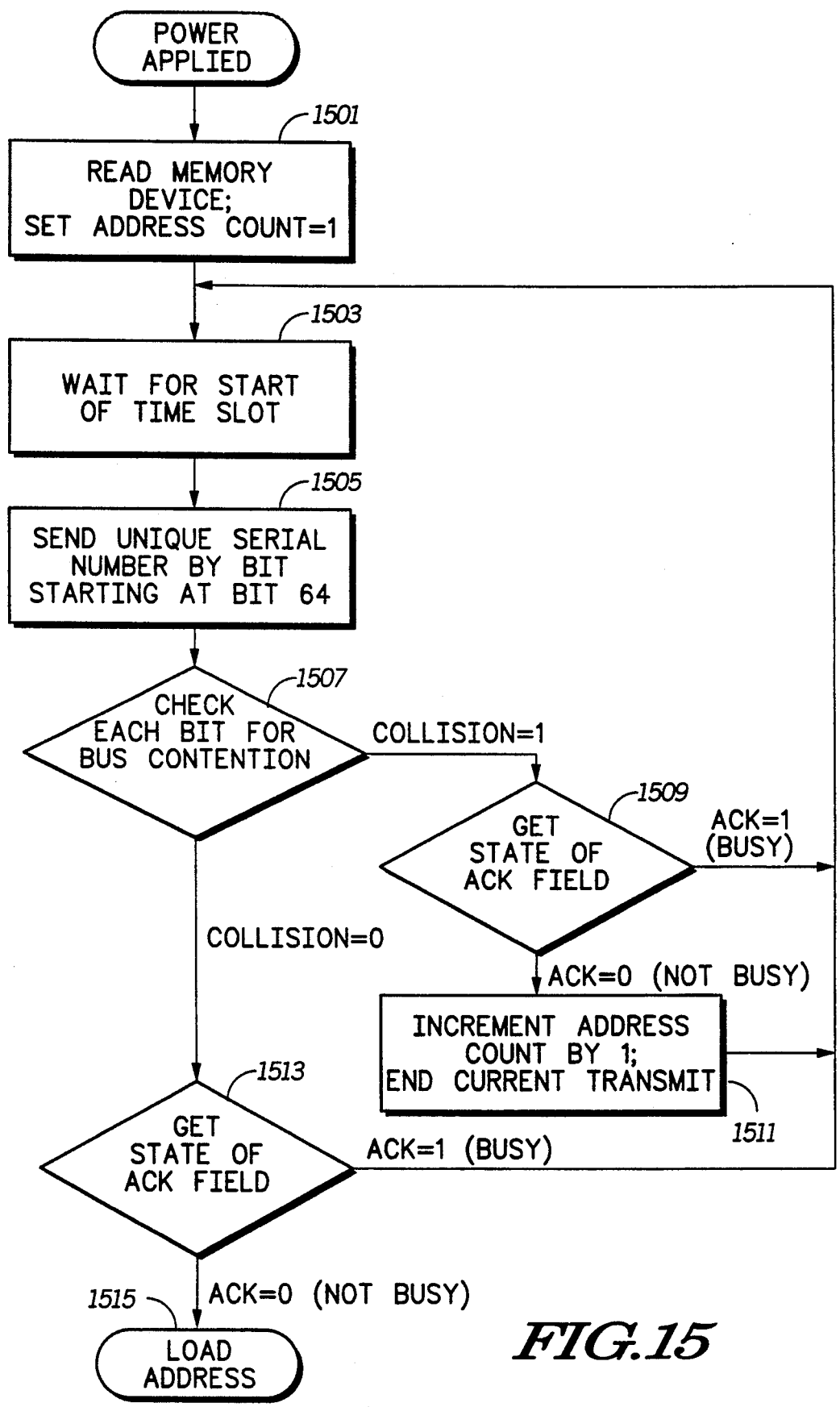
FIG. 15 is a flowchart for the process of power up employed by the peripheral.

The process followed by each peripheral device is shown in the flowchart of FIG. 15. After power is turned on for the peripheral, memory is read and the address count is set at an initial "1", at 1501. Following a wait for the start of a time slot (at 1503), the unique serial number is sent on the bus bit by bit starting at bit number 64 (at 1505). At each bit, contention for the bus is checked, at 1507. If a collision is detected, a test of the state of the ack field is made, at 1509. A result of a busy condition returns the process to wait for the start of the next time slot; a result of a not busy condition results (at 1511) in the incrementing of the address count by one, a cessation of the-e-current serial number transmission, and a return to wait for the start of the next time slot. If a collision is not detected in the checking step 1507, the state of the ack field is tested (at 1513) and the current address count is loaded (at 1515) for the peripheral. If a busy condition is noted from the ack field, the process returns to wait for the start of the next time slot.

Figure 11:
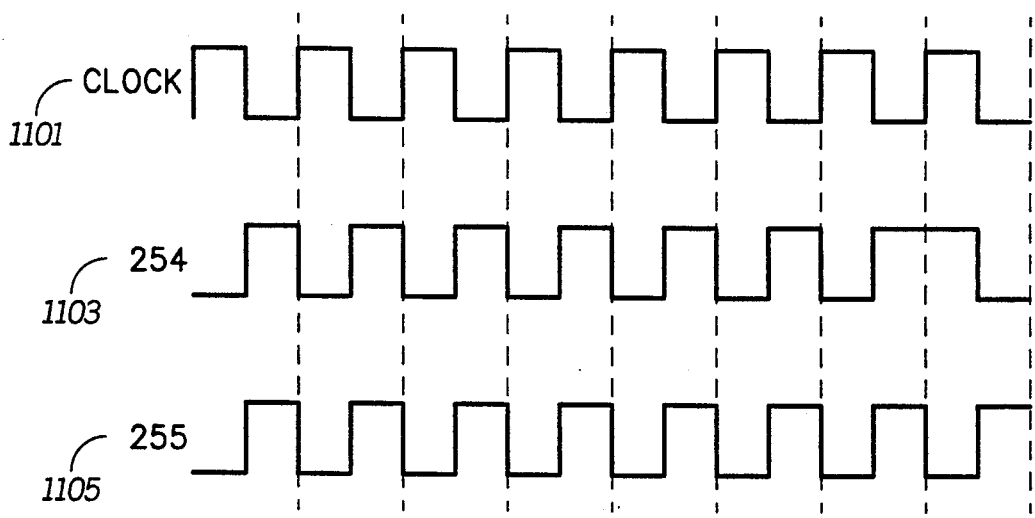
FIG. 11 depicts a diagram of the clock used for Manchester encoding data bits transmitted by the data transfer apparatus, as well as samples of 8 bit streams having the values 254 and 255.

FIG. 11 depicts the bit-by-bit timing diagram of the clock, and two 8 bit sequences which are Manchester encoded by the clock. One sequence of pulses 1103 is of the Manchester code for the value 254, the other set of pulses corresponds to the value 255. The difference between the pulse trains being the least significant bit.

In the preferred embodiment of the present invention a conventional Manchester Encoder 709 is used to encode data sent out over the high speed data bus. The Manchester Encoder 709 output of the data transfer apparatus is identical to the clock used to derive the Manchester code if the data bit sampled is a zero, and it is inverted from the clock if the data bit in the sampled interval is non-zero. The Manchester Encoder 709 output is one of the two inputs to the Collision Detect 713, an Exclusive-Or function gate.

The other input to the Collision Detect 713 is derived from all the Manchester Encoder 709 outputs of peripheral devices which are connected to the cellular radiotelephone by their data transfer apparati through data bus driver 715 and comparator 711. The resulting uplink data bus line forms a wired-AND configuration of the Manchester Encoder outputs from all attached peripheral devices. The Exclusive-Or function is then performed with the two inputs, and if the Manchester encoded data bit matches the data bus state signal bit, then the Collision Detect 713 circuit output is zero, and the next Manchester encoded data bit from the Tx/Rx Shift Register 707 is shifted into the Manchester Encoder 709 and then compared with the data bus state signal. The original value of the data bits stored in the EEPROM 217 is such that during the start-up procedure the peripheral device with the largest value stored in its EEPROM 217, and which is subsequently shifted through the Tx/Rx Shift Register 707, and then out to the data bus, will have a Collision Detect 713 equal to zero for all 64 bits, and therefore it will gain access to the data bus first.

Figure 12:
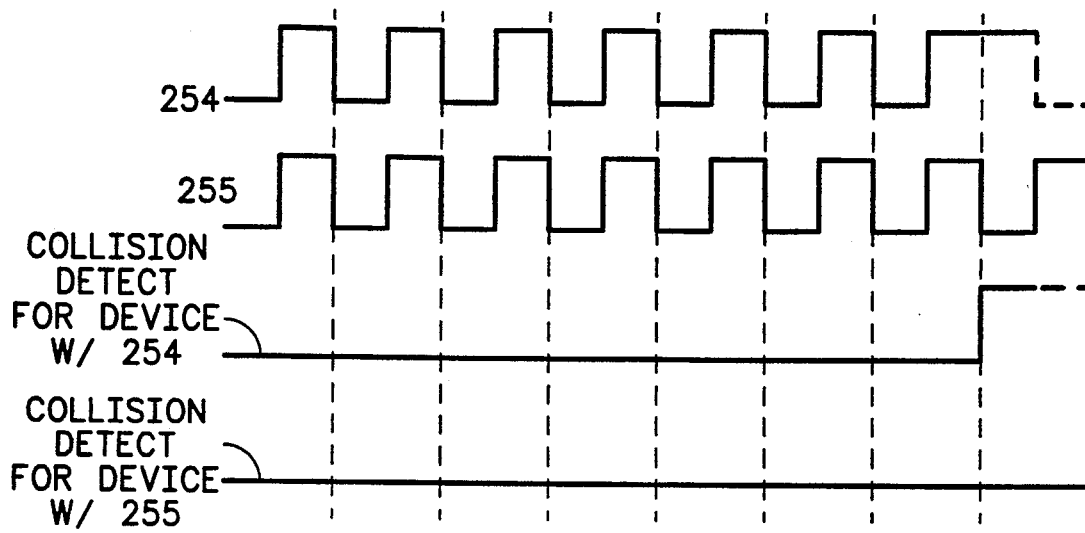
FIG. 12 depicts a diagram for the outputs of the Collision Detect circuits for two data transfer apparati which are contending for access to the data bus, and the resulting determination at the eighth bit of the stream.

FIG. 12 depicts in a timing diagram the outputs of the Collision Detect 713 circuits of two data transfer apparati which are "contending" for the data bus with the values 254 and 255 being output from their respective Manchester Encoders 709. After gaining access to the data bus, this "winning" data transfer apparatus will send the information in its 64 bit word to the bus master 205 through the bus master's data transfer apparatus 219. If the Collision Detect 713 circuit output is 1, then there has been a collision detected, and the data transfer apparatus has "lost" the bus determination and therefore the data transfer apparatus can not gain access to the bus. The data transfer apparatus that "loses" a bus contention determination during the start-up procedure in this manner than increments its Priority Counter 701 and does not attempt to gain access to the data bus until the next time slot. In this manner, each data transfer apparatus 211 which fails to gain access to the data bus during the start-up procedure increments its Priority Counter 701. The first data transfer apparatus which gains access to the data bus will be given the address corresponding to the value one when it finally gains access to the bus. This address will be used in its Address Field 407 by the device whenever it transmits data, or attempts to transmit data, for the duration of its operation over the high speed data bus. This address value is also the value stored in the Destination Address 311 of downlink messages which it receives. When the data transfer apparatus 211 gains access to the data bus, it transmits zero for the address in its Source Address Field 407 to the central radiotelephone processor register 1001 in FIG. 10, register "C" in the radiotelephone's bus master data transfer apparatus. This is the information in the 48 bit Data Field 409, which originated in the peripheral device EEPROM 217. The central processor 205 in the radiotelephone 113 will use this information to assign a time slot to the data transfer apparatus 211. The central radiotelephone processor (bus master) 205 allocates dedicated time slots within each frame 601 for peripheral devices (to send digitized voice messages to the speech coder 223) which receive analog voice messages as input, such as a handset 109 for a mobile radiotelephone 113, or the portion of a portable radiotelephone which contains the microphone input 209. The analog voice messages are digitized by a codec 213.

Data transfer apparati which fail to gain access during any particular bus contention in the start-up procedure will retry again with the Priority Counter 701 incremented by one. Again, the data transfer apparati attempting to gain access to the data bus will break the bus contention by doing a bit-by-bit comparison between their respective Manchester Encoder 709 outputs and the data bus state signal through the Collision Detect 713 circuit. A peripheral device's data transfer apparatus 211 which fails to gain access to the data bus will stop trying to gain access to the bus when the output of a Manchester encoded bit fails to match the data bus state signal through the Exclusive-Or function of the Collision Detect circuit 713. FIG. 12 depicts the output of the Collision Detect circuit 713 when a collision is detected in the eighth bit transmitted resulting in a "1" value from the Collision Detect circuit 713. Accordingly, the second data transfer apparatus which gains access to the data bus will assign itself a value of two for its address on the bus. Again the 48 bit data field is transmitted to the bus master 205 (central radiotelephone processor), and if the peripheral device containing the data transfer apparatus is an analog voice message input peripheral device such as a radiotelephone handset 109, then a dedicated time slot will be allocated in each frame 601 so the data transfer apparatus 211 can transmit to the bus master 205. In the preferred embodiment, there is a maximum of five such time slots which may can be assigned to voice message input peripheral devices such as handsets 109 for mobile radiotelephones 113. The sixth time slot is a general use time slot which is used to send non-voice digital data (digital data) messages and control messages for the data bus.

This start-up procedure detailed above continues until all of the devices attempting to gain access to the data bus have gained access to the data bus; have assigned themselves addresses; and have sent the specific peripheral device information, used to establish data bus access priority (by which the central radio processor may assign dedicated time slots) for the duration of the operation of the data bus, to the bus master 205. The Transmit Register 705 serves as a buffer during the start-up procedure so in the case where data bits are no longer available in the Tx/Rx Shift Register 707 for the next attempt to gain access to the data bus, by a data transfer apparatus 211 which has previously failed to gain access, the data bits can be shifted into the Tx/Rx Shift Register 707 from the Transmit Register 705.

During normal operation, and during the execution of the start up procedure, the bus master 205 will flow control digital data messages. The bus master 205 will not flow control digitized analog voice messages. The digitized voice messages are routed to the speech coder 223 for processing. The speech coder 223 is used to control audio functions through the Audio Control function 231. The digital data messages are routed to the bus master 205 for processing. Therefore since the digitized voice messages are not actually processed by the bus master, the bus master 205, which has the speech coder 223 under its control, allows messages destined for the speech coder to be sent without "holding off" (stopping and starting transmission to the speech coder 223 for some variable time sequence) the digitized voice messages. Digital data messages which are to be processed by the bus master 205 can be "held off" until the bus master 205 is not busy processing messages. The bus master 205 holds off these messages by sending the Ack Field 305 with a value of "1". When the bus master 205 is not busy processing messages, it will send out the Ack Field 305 with a value of zero, and peripheral devices wishing to send messages which are to be processed by the bus master may then attempt to access the bus master. A depiction of this flow control to and from peripheral devices is contained in the flowcharts of FIGS. 13A and 13B.

After addresses have been assigned to all data transfer apparati attempting to access the data bus, the bus master 205 and speech coder 223 can communicate with all peripheral devices connected over the radiotelephone data bus. In normal operation the key mechanisms of the data transfer apparatus when it is going to transmit data out to another data transfer apparatus connected to it over the data bus are depicted in FIG. 9.

Figure 8:
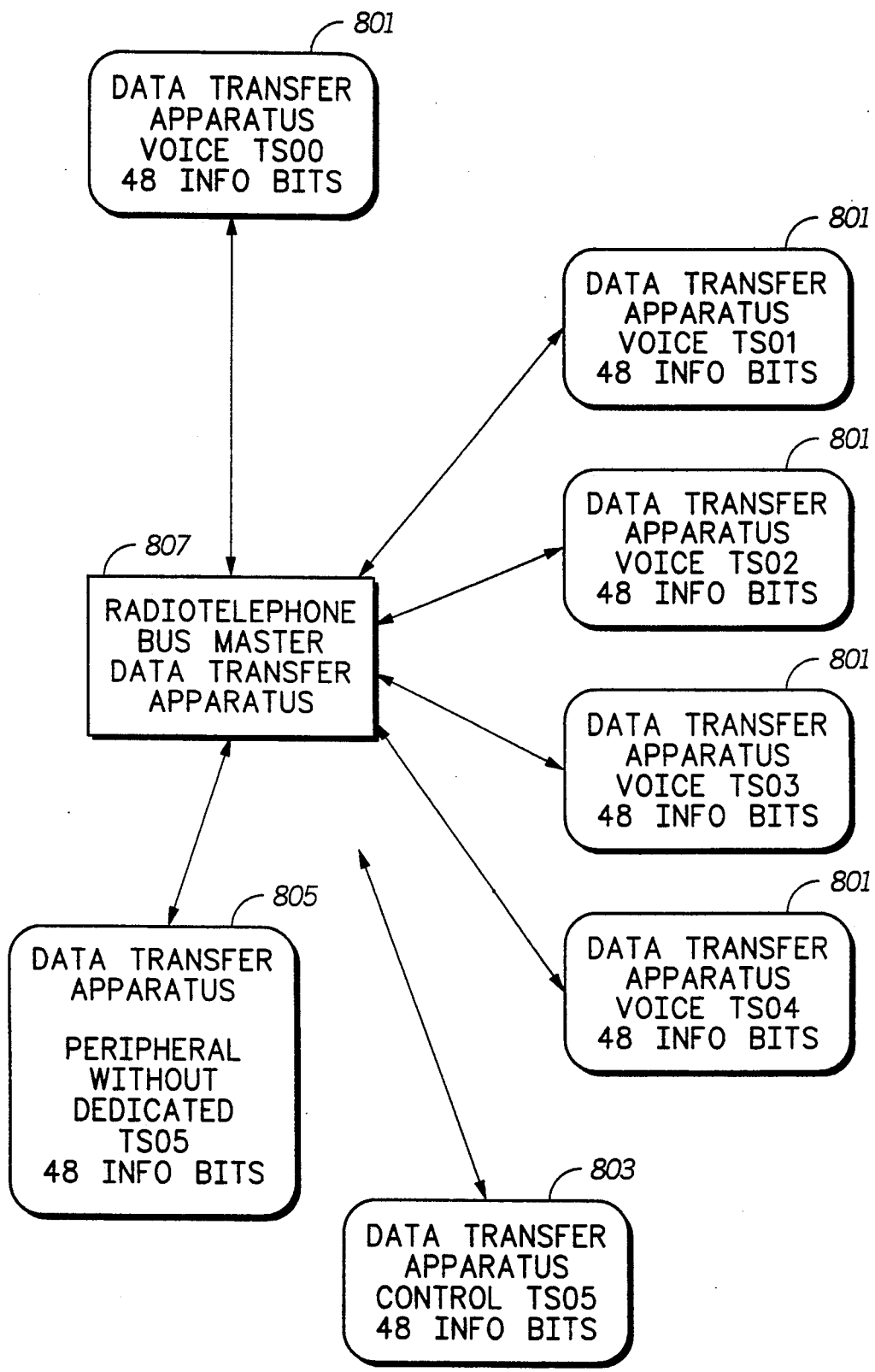
FIG. 8 is a diagram depicting the sequential nature several devices may use to send data to, and from, the transceiver on the data bus.

It is a feature of the present invention that the data transfer apparatus 211 within each peripheral device can process either digital data signals or digitized analog signals, digitized analog voice messages being of particular importance in cellular radiotelephone applications. In the preferred embodiment, the information sent in the Priority Field 403 of a peripheral device 203 inputting digitized analog voice messages to the radiotelephone 113 over the data bus will be such that the data transfer apparatus 211 of the peripheral device 203 will normally be able to access the data bus for at least one time slot 603 during every frame 601 of the data bus operation. This is because digitized analog voice messages are not flow controlled by the bus master 205, moreover, the bus master 205, because of the information (originally stored in the EEPROM 217) transmitted to it from a particular peripheral device 203 (which inputs digitized analog voice messages) during the start-up procedure, will allocate at least one time slot 603 to each of such peripheral devices 801 depicted in FIG. 8, during each frame 601, up to a maximum of five dedicated time slots in the present invention. Time slots which are not dedicated to peripheral devices which input analog messages are shared in a time multiplexed manner by data bus Control Messages 803 transmitted from the bus master 205 to peripheral devices for controlling information flow on the data bus and messages transmitted to and from peripheral devices 805 which do not have dedicated time slots.

The data bus controls bus access for messages which are not digitized voice messages by transmitting downlink header 411 information in each timeslot with time slot synchronization information and by setting or clearing the Ack Bit Field 305, thereby giving peripheral devices permission to send (or to hold off) such messages on the data bus. Each data transfer apparatus 211 has a particular address which as mentioned above, was determined during the start-up procedure according to particular information contained in EEPROM 217 which resolved the start-up bus contention.

If the peripheral device is a peripheral device which receives analog voice messages at its input, such as a handset 109 for a mobile cellular radiotelephone or the user interface portion of a portable radiotelephone, the data transfer apparatus 211 will allocate itself a priority with respect to other peripheral devices that will ensure the peripheral device normally has access to a time slot during every data bus frame 601 so that it can send information to the speech coder 223. For peripheral devices 203 which are used to input analog voice messages, this is done by writing a Priority Field 403 with a value of two-hundred fifty-four into the eight bits allocated to the Priority Field 403 contained in the 64 bit word constructed by the data transfer apparatus 211.

Figure 13A:
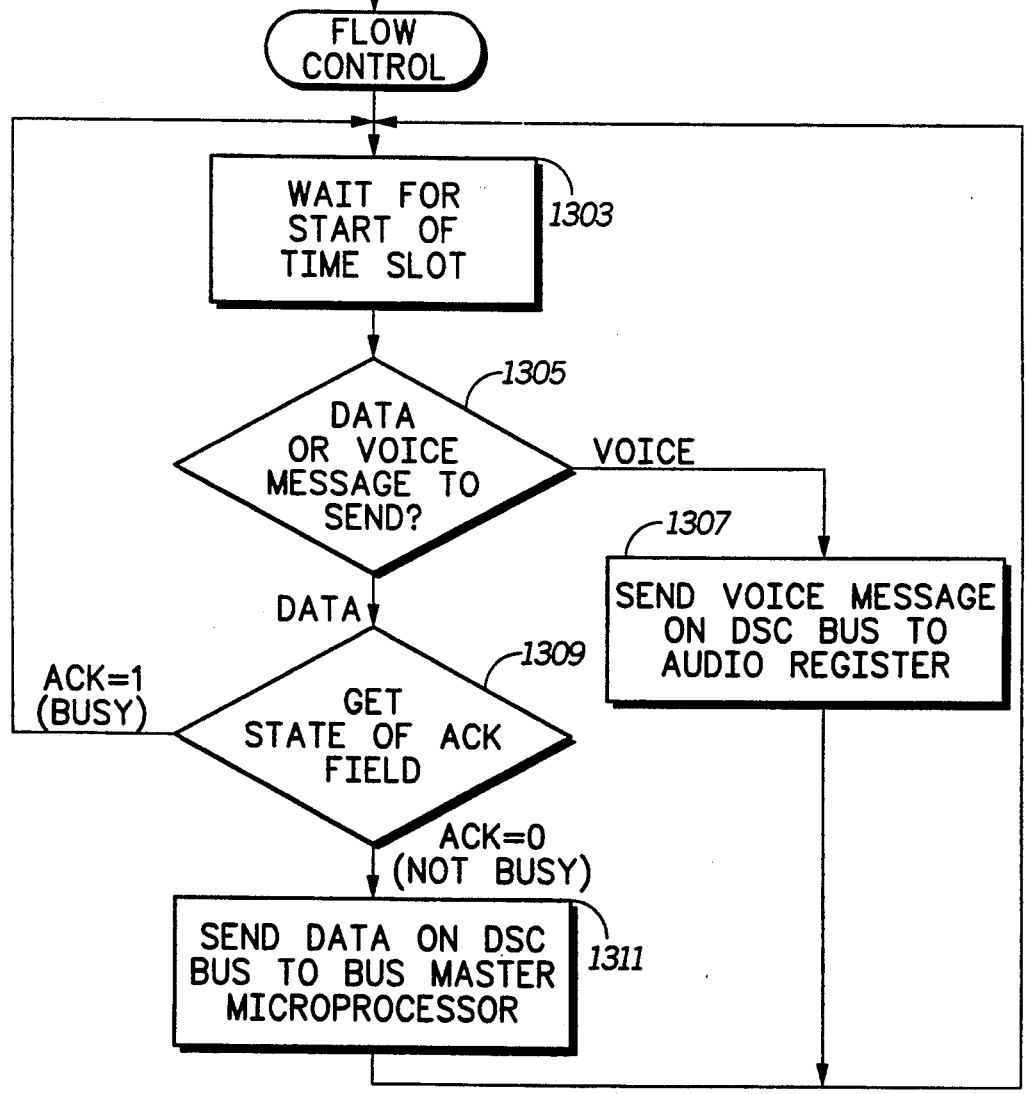
FIGS. 13A—13D are flowcharts for the process of flow control for the peripheral transmitting to the master (FIG. 13A); for the peripheral receiving from the master (FIG. 13B); for the master receiving from a peripheral (FIG. 13C); and for the master transmitting to a peripheral (FIG. 13D).

In the process of flow control, data messages are sent to the bus master microprocessor only when the state of the acknowledgement field indicates a not busy condition. Voice messages, however, are not subject to control dependent upon the state of the acknowledgement field. Since the voice message is not delayed, the real time processing of the voice message is enhanced because the voice message is directed to the speech coder without delay. As shown in the flowchart of FIG. 13A, the data transfer apparatus 211 for the peripheral device waits for the start of the downlink timeslot, at 1303. A determination of whether a voice message or a data message is to be sent is made at 1305. If the message is a voice message, digitized voice message information is sent on the DSC bus to the Audio Register, at 1307, and the process returns to wait for another downlink timeslot. However, if the determination is that a data message is to be sent, a determination of the state of the acknowledgement (ack) field is made, at 1309. If the ack field indicates a not busy condition (ack=0), data is sent to the bus master microprocessor 205, at 1311. If the ack field indicates a busy state, the process waits for another downlink timeslot and delays the transmission of the data message until the ack field indicates a not busy state.

Figure 13B:
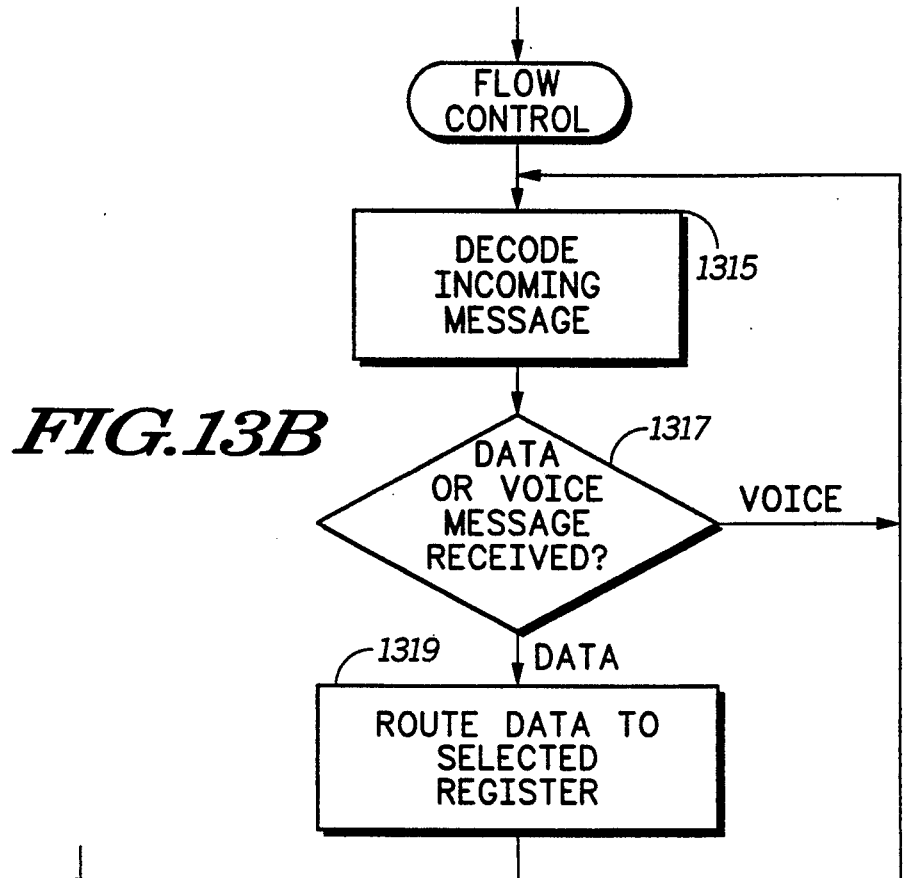

In the opposite direction, the peripheral receives messages directed to it from the data bus. As shown in the process of FIG. 13B, the incoming message is decoded (at 1315) and a determination is made (at 1317) whether a data or a voice message has been received. If the received message is a data message, the data is routed (at 1319) to the selected register identified in the downlink message.

Figure 13D:
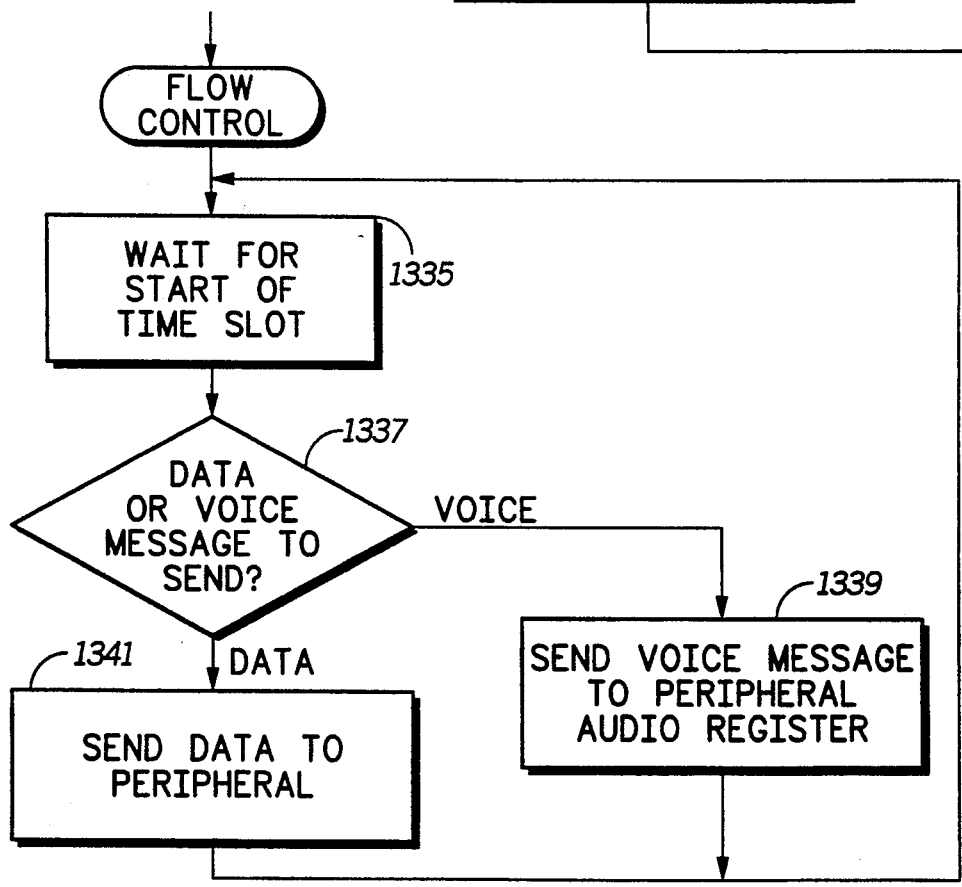
Figure 13C:
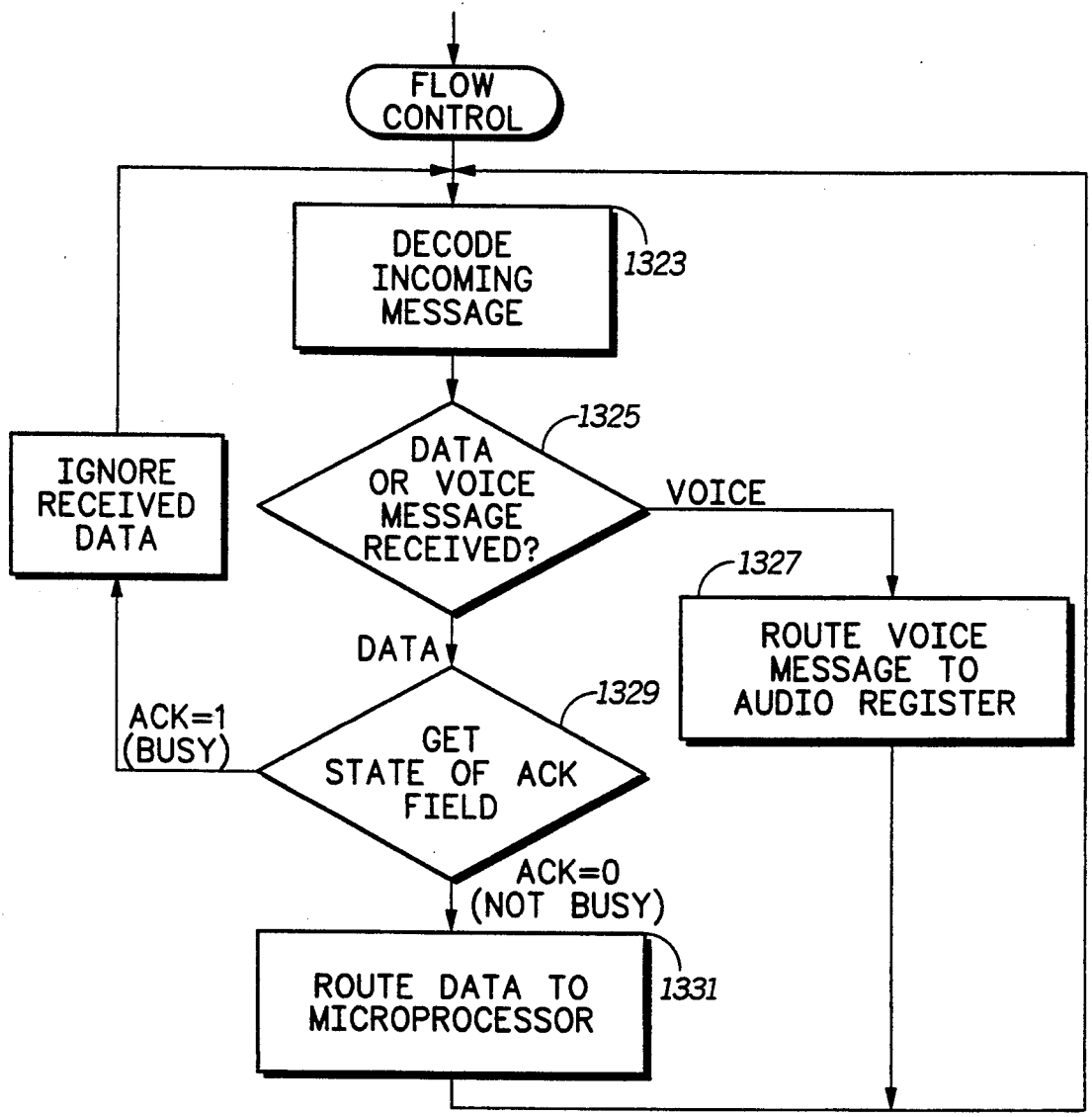

Flow control of messages received by and transmitted from the master as shown in the flowcharts of FIG. 13C and FIG. 13D. The master receives a message from a peripheral and decodes the message, at 1323. Again, a determination is made (at 1325) whether a data message or a voice message was received. If the message was a voice message, the voice message is routed (at 1327) to the Audio Register. If the received message was a data message, the state of the ack field is determined, at 1329, and if the ack field indicates a not-busy state (ack=0) the data is routed to the microprocessor, at 1331. Otherwise the received data is ignored by the busy microprocessor and the process returns to await the next received message.

A transmission from the master follows the flow control process of FIG. 13D. The process waits for the start of a timeslot, at 1335, and determines, at 1337, whether the message to be sent is a data message or a voice message. If the message is a voice message, the digitized voice message is sent (at 1339) to the specific peripheral Audio Register. If the message is a data message, it is sent (at 1341) to the specific peripheral.

Figure 16A:
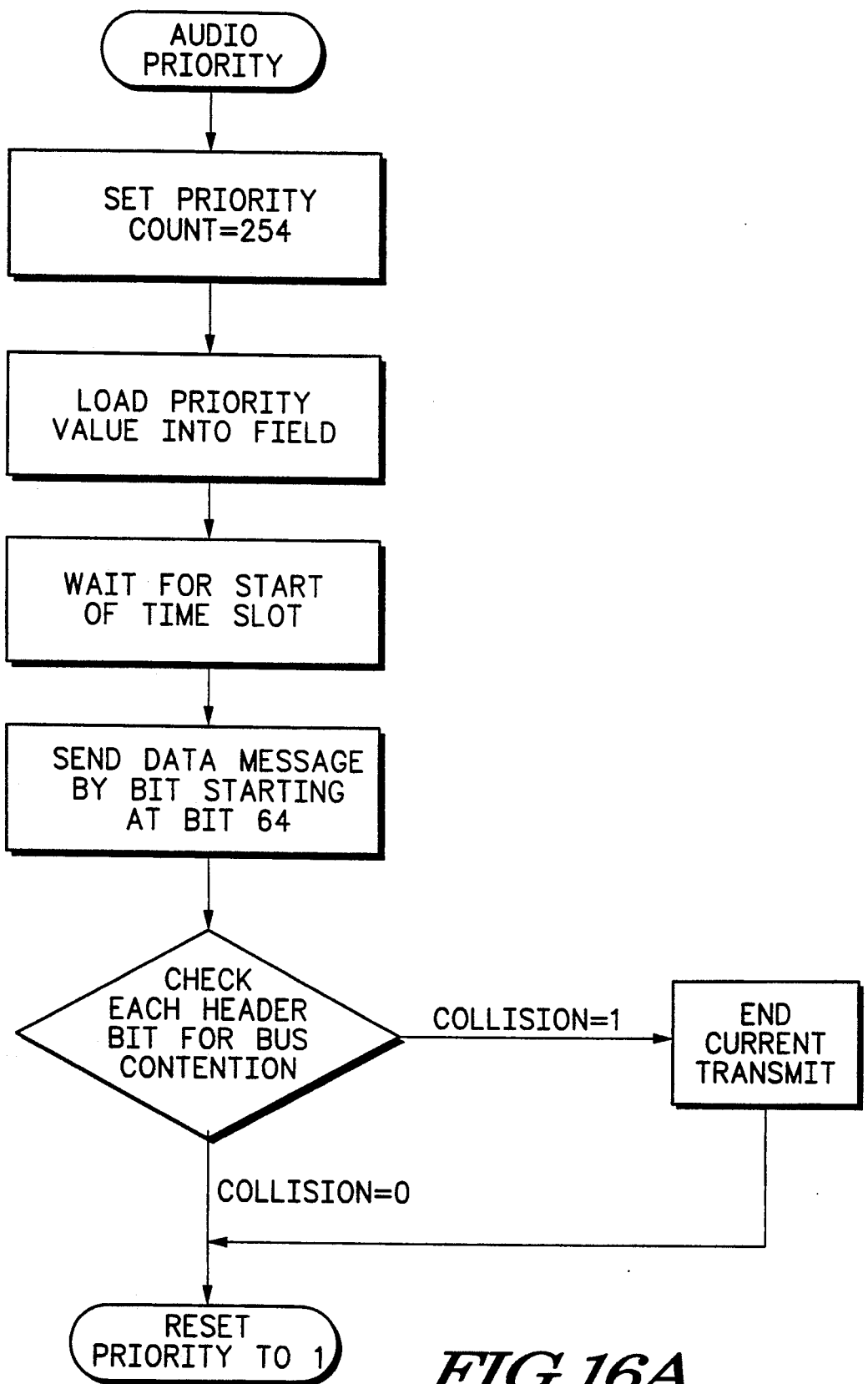
FIGS. 16A and 16B are flowcharts for the process of peripheral priority flow control for a priority audio message (FIG. 16A) and a special priority message (FIG. 16B).

Referring to FIG. 9 which depicts the throughput path of messages sent through the data transfer apparatus during post-start up procedure operation, all digitized analog voice messages such as those originating at a microphone 209 input to a radiotelephone handset 203 which are subsequently digitized by a codec 213, as in the preferred embodiment, come into the data transfer apparatus 211 at the Transmit Register 901 where the data bits are serially shifted into the 48 bit Tx Register Bits 705, and the Audio Header 903 is added to make up the 64 bit word used over the data bus. The Priority Field contains which is applied as shown in FIG. 16A the value "254". All digitized analog voice messages are processed in this manner through the Transmit Register 705. The data bits 905 which contain the digitized analog voice message bits are then parallel loaded through a tri-state buffer 907. Then the internal routing of the data transfer apparatus 211 gates the tri-state 907 to the final output register, Tx/Rx Shift Register 707. From there, the 48 data bits (plus the Audio Header 903 bits) are serially transmitted to the Manchester Encoder 709 then out on the data bus as described in the start-up procedure. In the case of peripheral devices used to input analog voice messages to the radiotelephone (such as handsets 109), the priority value in the Priority Field 403 is such that it will normally gain the bus over any other peripheral device attempting to access the bus. Moreover, since it is a voice input device, the bus master 205 will have synchronized the peripheral device 211 to a dedicated time slot so that no bus contention with another voice message input peripheral device should arise, and if bus contention does arise with another non-voice message peripheral device, the high priority value of 254 will normally ensure that the voice input device "wins" a bus contention determination (gains access to the data bus to send its message). The 16 bit Audio Header 901 which contains the Priority Field 403 with a value of 254 for a voice device, such as a handset 109 for a cellular mobile radiotelephone 113, is routed in parallel to a Header Mux 911, then to the tri-state buffer 907, where the 16 bit header is stored with the 48 bit data field until the internal routing bus of the data transfer apparatus 211 gates the 64 bit word into the Tx/Rx Shift Register 707. In addition to a Priority Field 403 value of 254, the Header Mux 911 loads the Register Select Field 405 with the value "F" so that digitized analog voice messages are routed to the Receive Audio Register 1007 in the data transfer apparatus, shown in FIG. 10, which receives the message. This register 1007 may be contained in a data transfer apparatus used to transfer information into the central processing portion 207 of the bus master 205 or in the data transfer apparatus 211 of a peripheral device which can receive digitized voice messages from the central processing portion 207 of a radiotelephone. The last field loaded by the Header Mux is the Source Address Field 407 which was determined during the start-up procedure and is stored in the Control Register 901 from where it is loaded into the Header Mux 911. From the Tx/Rx Shift Register 707, the 64 bits are serially sent to the Manchester Encoder 709 then out on the data bus and to the Collision Detect 713 circuit. In the case of a voice input device, such as a handset 109 for a cellular mobile radiotelephone, the bits originating in the Audio Header 901 are routed through the Header Mux 911 and the tri-state buffer 907 without modification, then to the Tx/Rx Shift Register 707 and then to the Manchester Encoder 709. From the Manchester Encoder 709, the Priority Field 403 bits are then shifted serially to the data bus and the Collision Detect circuit 713 as in the start-up procedure. The 16 bit header word output of the Manchester Encoder 709 is bit-by-bit compared as in the start-up procedure. The Manchester Encoder 709 output is one input to the Collision Detect 713 circuit and the other input is the data bus state signal as in the start-up procedure. In this manner, the priority value of 254 which was assigned to the digitized analog voice message by the Audio Header 901 and which makes up the Priority Field 403 of the digitized analog voice message is serially transmitted to the data bus and the Collision Detect circuit 713. As in the start-up procedure, the Collision Detect circuit 713 does a bit-by-bit comparison between the output of the Manchester Encoder 709 and the data bus state signal. The Priority Field 403 is the first portion of the 16 bit header word which is compared by use of the Exclusive-Or function within the Collision Detect circuit 713. In the case of a voice input device, the Priority Field 403 has a value of 254. Because of the mechanisms employed by the Collision Detect circuit 713, Manchester Encoder 709, and means used to generate the data bus state signal, the peripheral device with the highest value in its Priority Field 403 will gain access to the data bus when there is bus contention. During the bit-by-bit comparison, at a particular bit, a peripheral device which does not have the highest value in its Priority Field 403 will detect a collision and stop attempting to access the data bus. Similar to the procedure described in the start-up procedure (except only the header 411 portion of the time slot is used to determine bus contention proceeding from the most significant bit), the peripheral device with the highest value in its Priority Field 403 will gain access to the data bus. If the priority fields are equal, then the Register Select Fields 405, and Source Address Fields 407 are processed through the bit-by-bit comparison to determine the data bus contention, as in the start-up procedure. In the case of a voice input device, the voice input device will normally "win" the data bus determination in the first 8 bits of the bit-by-bit comparison (the Priority Field 403) because the value, 254, of the Priority Field 403 is normally greater than all other values that can be stored in the Priority Field, except for one value (255). The message accordingly takes priority over all messages seeking bus allocation of a lower priority, less than 254.

As depicted in FIG. 9, a Priority Field 403 different from the value 254, assigned to digitized analog voice messages in the Audio Header 903, is assigned to other types of messages which are not routed through the Transmit Register 705. These other types of messages are digital data messages routed into the data transfer apparatus 211 at the I/O Buffer 915, one byte at a time. Two types of data are routed through this I/O Buffer 915: one type is data which does not require the high speed real time sampling of digitized analog voice messages, this type is routed with an initial priority value of one in the Priority Field 403; the other type is for data messages which require a priority value, 255, higher than that of digitized analog voice messages (254) for messages of the highest priority.

For example, the lower priority messages (Priority Field value is less than 254) may include data bits serially inputted from a keypad 215 of a portable cellular radiotelephone or the keypad 215 of a handset of a cellular mobile radiotelephone, or digital data originating from a facsimile machine 107, which needs to be time slotted and frame 601 formatted for the high speed data bus so the messages can be sent to the radiotelephone's main processing block 207 without the high speed sampling required for digitized analog messages. The data transfer apparatus 211 of the present invention can be contained within peripheral devices such as a facsimile machine 107, cellular mobile radiotelephone handset 109, the user interface portion 203 of a portable or mobile cellular radiotelephone, or other devices which may be connected to a cellular radiotelephone's main processing block 207, so that information may be transmitted by the cellular radiotelephone 113 through the cellular system.

In the case of keypad 215 information (The data routing outline here applies to other information which does not require the higher priority of digitized analog voice messages.), the keypad sample is received as a single byte of information at the I/O Buffer 915. The data is then tested to ensure a valid key press has occurred and built into a 33 bit word in the Debounce-Register function 917, where the 33rd bit is a switchhook indicator which indicates whether the cellular radiotelephone handset is in its hang-up cup or not. The Debounce-Register function 917 compares a sample of the sampled key press byte transmitted from the I/O Buffer 915 with a previous sample, and after comparing several sequential samples to verify that a valid press has occurred, the key press information is formatted into a 33 bit word and transmitted in parallel to the Tx/Rx Shift Register 707 as a 48 bit word into the data field bits through the Tri-state 907, the additional 15 bits in the 48 bit data field being configured as invalid bits. Appended to the 48 bit data field created in the Header-Mux function 911 are the Source Address Fields 407 and Register Select Fields 405 along with the Priority Field.

In the case of the data fields, for these digital data messages with priority lower than 254, created in the Debounce-Register function 917, the Register Select Field 405 contains the address of the Handset/µ processor register 1001, see FIG. 10, (Register "C") in the data transfer apparatus 219 connected to the central processing portion 207 of the radiotelephone from where the bus master processor 205 retrieves data sent to it over the data bus. The Source Address Field 407 as determined during the start-up procedure is afterwards constant in the Debounce-Register function 917 and contains the address determined during start-up in the 4 bit field Source Address Field 407. The Source Address Field 407 and Register Select Field 405 are transmitted to the Header Mux 911, and the 48 bit data field is transmitted to the Tri-state 907. The priority value, initialized to one in a Priority Counter 701 is appended in the Priority Field 403 to make-up the 16 bit header of the 64 bit data bus word in the Header Mux 911, and after the Priority Field 403 is added to the 16 bit header, the entire 16 bit header is then transmitted into the Tri-state 907 from the Header Mux 911, in parallel, where it is combined into a 64 bit word. The entire 64 bit word is subsequently transmitted to the Tx/Rx Shift Register 707. After the 64 bit word is in the Tx/Rx Shift Register 707, the data transfer apparatus attempts to shift the word onto the data bus in the next appropriate time slot, which is a general use time slot 803 or 805, and not a time slot 801 allocated to a voice input device. In the case of a digital data message with a priority lower than the value of a digitized analog voice message (254), such as key press information, the data transfer apparatus 211 will attempt to gain access to the high speed data bus every time slot. The mechanism for gaining access is similar to that used in the start-up procedure, the Manchester Encoder 709 output is compared to the data bus state signal (processing from the most significant bit to the least significant bit of the header 411) for the 16 bit header word to determine if there is data bus contention, and if the Collision Detect circuit 713 detects a collision, the data transfer apparatus 211 will stop trying to access the data bus. As in other bus contention scenarios discussed above, a bit-by-bit comparison is done by each peripheral device's data transfer apparatus attempting to gain access to the data bus.

When a data transfer apparatus loses the bus contention to another data transfer apparatus, the Collision circuit 713 output is routed to the Internal Bus Arbitrator 923 within the data transfer apparatus 211 which then increases the value of the data transfer apparatus' Priority Field 403 by a value of one. The Internal Bus Arbitrator 923 sends a clock signal to the Priority Counter 701 in order to increase the value of the Priority Field 403 by value of one. The initial value in the Priority Counter 701 is one at the beginning of the bus access attempt by the data transfer apparatus. After a single failed attempt the Priority Counter 701 has a value of two which will be loaded into the Header Mux 911 as the Priority Field 403 from the Priority Counter 701 the next time the data transfer apparatus 211 attempts to gain access to the data bus. This next attempt will occur when the next time slot becomes available. Iteratively, this procedure continues until only one data transfer apparatus is left attempting to gain access to the high speed data bus, this remaining data transfer apparatus will gain access to the data bus. After a particular data transfer apparatus gains access to the high speed data bus, the Internal Bus Arbitrator 923 will reset the Priority Counter 701 of the data transfer apparatus which gains access to the lowest value, one. A data transfer apparatus that was unable to gain access will try to gain access to the data bus when the next time slot becomes available. Again, if more than one data transfer apparatus is attempting to gain access to the data bus, the bus contention will be determined as before, there is a bit-by-bit comparison of the Manchester Encoder 709 outputs with the data bus state signal (after being passed through a comparator to ensure a proper digital signal is available) through the Collision Detect circuit 713 to determine the bus contention. As before, in this case where the priority value is less than 254, when the output of the Manchester Encoder 709 does not match the data bus state signal, a collision will be detected, and the particular data transfer apparatus which detects a bus collision will increment its Priority Counter 701 and wait for another time slot in order to try to access the data bus.

As mentioned above there is a type of digital data message assigned a priority value higher than the value of 254 assigned to digitized analog voice messages. This type of digital data message (high speed message) is also input to the data transfer apparatus I/O Buffer 915. This high speed message requires faster access to the bus than any other information sent to the data transfer apparatus 211. The routing for this data is as described above for data which starts with a priority value of 001 in the Priority Counter 701, except that the high priority data begins with a priority value of 255 loaded into the Priority Counter 701. With this value of 255 loaded into the Priority Counter 701, after the Data Field 409, Register Select Field 405, and Source Address Field 407 are assembled in the Debounce-Register function 917, the Data Field 409 is transmitted in parallel to the buffer Tri-state 907, and the Register Select 405 and Source Address Field 407 are sent to the Header Mux 911 where the Priority Counter 701 loads the value 255 into the Priority Field 403 bits. Once the Priority Field 403, Register Select Field 405, and Source Address Field 407 are loaded into the Header Mux 911, the 16 bits are transmitted to the buffer Tri-state 907. Once both the 48 bit data field and the 16 bit header field are in the buffer Tri-state, the 64 bit field is shifted in parallel to the Tx/Rx Shift Register 707. Therefore, when the next time slot access opportunity occurs, the data transfer apparatus will attempt to access the data bus. During the bit-by-bit comparison of the Priority Field 403, a data transfer apparatus with the value 255 stored in its Priority Field 403 will gain access to the data bus at the next available time slot unless there is another data transfer apparatus with an equal value in its Priority Field 403, in which case the bus contention will be determined by succeeding bits in the 16 bit header word as described above: the succeeding bits of the Manchester encoded 16 bit header word will be bit-by-bit compared (from most significant bit to least significant bit) with the data bus state signal to determine the bus contention. As previously discussed, each bit of the 16 bit header word the data transfer apparatus has in the Tx/Rx Shift Register 707 will be shifted into the Manchester Encoder 709 and the data transfer apparatus will determine if at any instance a bus collision has occurred. If a collision has been detected for any of the header bits, a message with a priority value of 255 will not gain access to the bus, and it will wait for the next time slot when it will try to access the bus with the value of 255 loaded into its Priority Field 403.

Figure 16B:
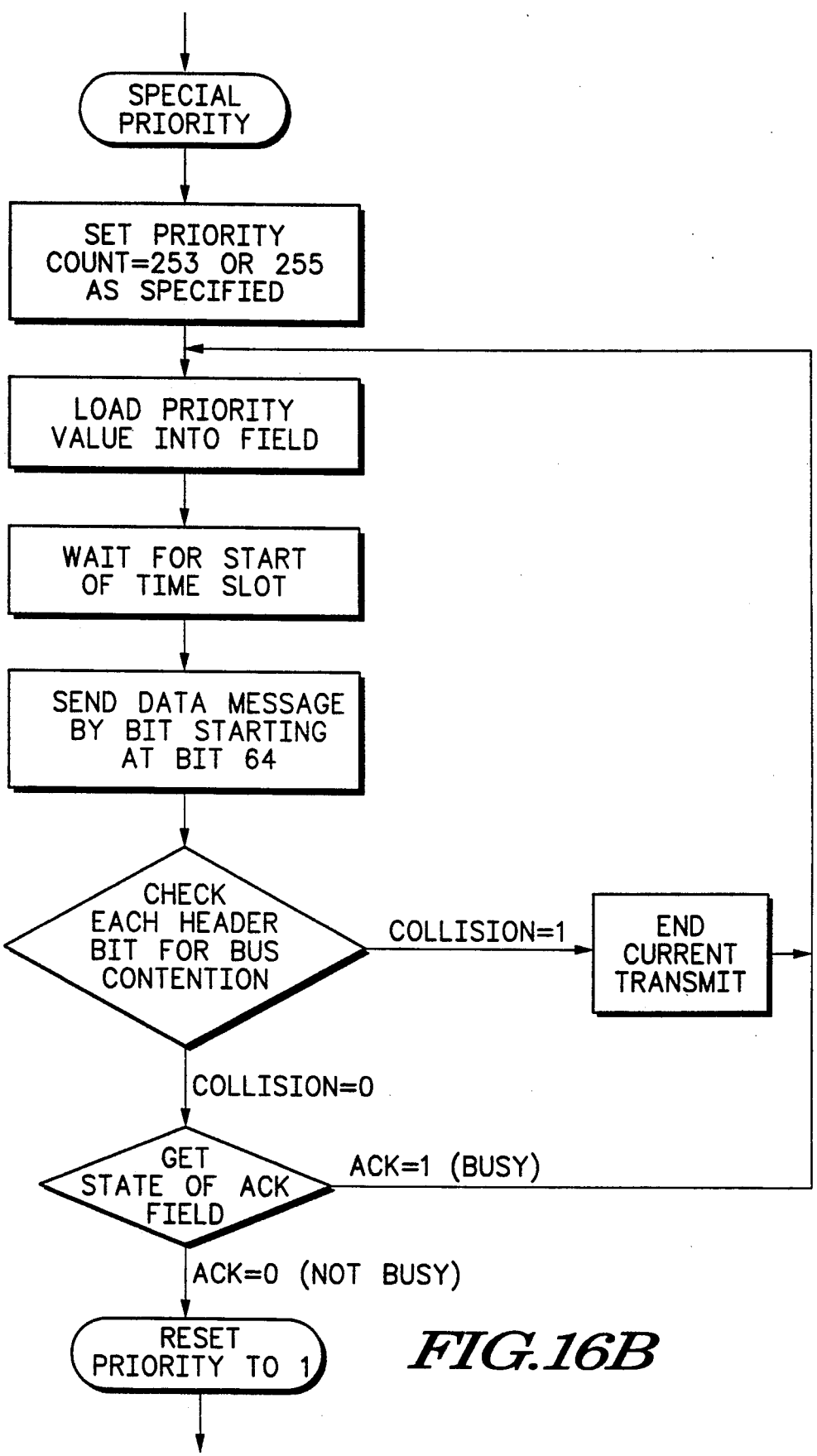

Thus, for a data transfer apparatus which is attempting to transmit data over the high speed data bus, there are at least three priority levels which the data transfer apparatus may load into its Priority Field 403 to try and gain access to the data bus, they are: a priority level of 255 for high speed messages which allows the data transfer apparatus to send out the message on the next available time slot regardless of whether the next available time slot is allocated to it or not; a priority level of 254 for digitized analog voice messages which allows these real-time messages to be sampled and transmitted to the central processing portion 207 of the radiotelephone 113 in a message time slot allocated to it in every frame 601 by the bus master (The central processing portion 207 of the radiotelephone contains the bus master 205 for the radiotelephone; memory devices such as RAM 229, ROM 227, AND EEPROM 225; and the speech coder 223 processor for digitized analog voice messages); and finally a priority level less than 254 which allows messages with slower sampling requirements than real time voice messages to be input at the I/O Buffer 915 and transmitted over a general use time slot of the data bus frame 601. The process of setting a priority count of "255" or "253" is shown in FIG. 16B.

The data transfer apparatus 211 is also able to receive data transmitted to it over the data bus. The same data transfer apparatus can be used to receive messages as either a data transfer apparatus 219 on the bus master side of the data bus or peripheral device 211 side of the data bus. (On the peripheral side, the data transfer apparatus 211 can be used to send digital data messages to devices such as a display 233 for the radiotelephone 113.) A block diagram of the means used to accomplish this is depicted in FIG. 10. The data is processed serially through the Comparator 1003 then decoded in the Manchester Decoder 1005, and then serially shifted into the Tx/Rx Shift Register 707. The Manchester Decoder 1005 is well known in the art and serves to recover the data bits transmitted from the Tx/Rx Shift Register 707 and Manchester encoded for transmission over the data bus to the receiving data transfer apparatus.

For example, in the case where the data transfer apparatus is used by the radiotelephone bus master 205 to receive data from peripheral devices, the Manchester decoded data is shifted into Tx/Rx Shift Register 707 and after the first 16 bits are decoded, the data transfer apparatus 219 is able to determine for which of the addressable registers within the data transfer apparatus 219 the data is intended. This is done by reading the Register Select Field 405 of the incoming message using the Register Select Decoder 1011. There are three main registers which may be addressed by another data transfer apparatus, these are the Handset/$\mu$P Register 1001 (register "C"), the Rx Audio Register 1007 (register "F"), or the Control Register 1009 (register "E") of the data transfer apparatus. When data is written into register "C" 1001 to the data transfer apparatus 219 used by the bus master 205, the bus master 205 sends out a downlink message 301 with the Ack Field 303 bit set high so that all peripheral devices are prevented from attempting to write to register "C" by the bus master 205. Conversely, register "F" 1007 within any data transfer apparatus may be addressed by another data transfer apparatus during any timeslot without regard to flow control. Register "F" 1007 is used to route digitized analog voice messages sent by a voice input device to the speech coder 223 through the bus master's data transfer apparatus 219. Again, digitized analog voice messages are allowed to be written to Register "F", the Receive Register 1007, without regard to the setting of the Ack Field 303 bit to a high value.

In the case where the receiving data transfer apparatus 211 is located in a peripheral device, the mechanism for receiving messages from the bus master central processing portion 207 of the radiotelephone is very similar to the case for receiving message when the data transfer apparatus 219 receives messages for the central processing portion 207 of the radiotelephone. When the peripheral device shifts in the 16 bit header from the Manchester Decoder 1001 to the Tx/Rx Shift Register 707, the data transfer apparatus is able to determine which register within the data transfer apparatus 211 will receive the data, the Control Register 1009, the Handset/$\mu$P Register 1001, or the Receive Audio Register 1007. Then depending on which of the registers has been selected (by reading the Register Select Field 309), the Tx/Rx Shift Register 707 will parallel load the destination register with different size fields. If the Control Register 1009 has been selected, a 32 bit field from the data bits in the Tx/Rx Shift Register 707 is shifted to the Control Register 1009. If the Receive Register 1007 has been selected, then a 48 bit field is loaded into the Receive Audio Register. If the Handset/$\mu$P Register 1001 is selected, then the entire 64 bit word in the Tx/Rx Shift Register will be parallel loaded into the Handset/$\mu$P Register 1001.

The preferred embodiment of the present invention uses a data bus which eliminates the need for separate signal lines to carry analog information from the user interface portion of a radiotelephone to the main processing portion of a radiotelephone. Moreover, the system of the preferred embodiment, is able to accommodate five voice message input devices and enables the radiotelephone to process the information without a significant degradation of the voice message. The system is able to accommodate digitized voice messages and digital data messages by use of a time multiplex scheme which gives a higher priority and dedicated time slots to digitized analog voice messages. The preferred embodiment of the present invention flow controls digital data messages which are processed by the central radio processor, but it allows digitized voice messages to pass without flow controlling such messages. A hardware apparatus is implemented to determine bus contention by devices attempting to access the data bus simultaneously. The hardware apparatus is also used at the start of the operation of the data bus to determine bus contention which results in the allocation of addresses to all peripheral devices connected over the data bus to the radiotelephone. The entire word formatted by the data transfer apparatus of the preferred embodiment is used to determine bus contention, including the data field. Also, the system of the preferred embodiment operates on the order of a magnitude faster than data buses found in current cellular radiotelephones.

We claim:

1. A data transfer apparatus for a radiotelephone peripheral using a time multiplexed data bus for communication with a master unit, comprising:

means for generating a contention determining field, further comprising means for generating data representative of priority in response to a busy condition on the bus when the radiotelephone peripheral is powered up;

means for accepting a plurality of data bits; and means for assembling said contention determining field and said accepted data bits for transmission in one time slot on the time multiplexed data bus.

2. A data transfer apparatus in accordance with claim 1 wherein said means for generating the data representative of priority further comprises means, responsive to a power up of the data transfer apparatus, for initially setting said data representative of priority to a first predetermined value and for changing said data representative of priority by a second predetermined value when a busy condition is encountered on the time multiplexed data bus.

3. A data transfer apparatus in accordance with claim 1 wherein said means for generating a contention determining field further comprises:

means for determining whether the data to be transferred is a digitized analog message or a data message;

means for assigning a first predetermined value to a register select bit when data to be transferred is a data message; and means for assigning a second predetermined value to said register select bit when the data to be transferred is a digitized analog message.

4. A data transfer apparatus in accordance with claim 1 further comprising a means for transmitting said assembled contention determining field and said accepted data bits at a predetermined data rate.

5. A data transfer apparatus in accordance with claim 1 wherein said plurality of data bits further comprise digitized voice information.

6. A data transfer apparatus in accordance with claim 5 wherein said digitized voice information further comprise data bits formatted by a linear codec.

7. A data transfer apparatus in accordance with claim 5 wherein said digitized voice information further comprise data bits formatted by a companded codec.

8. A data transfer apparatus in accordance with claim 1 further comprising a message frame consisting of six time slots.

9. A data transfer apparatus in accordance with claim 1 wherein said data bits further comprise specific peripheral device information.

10. A method of transferring data from a radiotelephone peripheral to a radiotelephone unit via a time multiplexed data bus, comprising the steps of:
   (a) generating data representative of priority in response to a busy condition on the bus when the radiotelephone peripheral is powered up;
   (b) accepting a plurality of data bits; and
   (c) assembling said data representative of priority and said accepted data bits for transmission of an assembled field in one time slot on the time multiplexed data bus.

11. A method in accordance with the method of claim 10 wherein said step (a) comprises the substeps of:
   (a1) initially setting said data representative of priority to a first predetermined value; and
   (a2) changing said data representative of priority by a second predetermined value when a busy condition is encountered on the time multiplexed data bus.

12. A method in accordance with the method of claim 10 wherein said step (a) further comprises the steps of:
   determining whether the data to be transferred is a digitized analog message or a data message;
   assigning a first predetermined value to a register select bit when the data to be transferred is a data message; and
   assigning a second predetermined value to said register select bit when the data to be transferred is a digitized or analog message.

13. A method in accordance with claim 10 further comprising the step of transmitting said assembled field at a predetermined data rate.

14. A method in accordance with claim 10 further comprising the step of (d) digitizing voice information to produce said plurality of data bits.

15. A method in accordance with claim 14 wherein said step (d) of digitizing voice information further comprises the substep of (d1) formatting said voice information.

16. A method in accordance with claim 10 further comprising the step of (d) creating a message frame from six of said time slots.

17. A data transfer apparatus for use in a radiotelephone unit, comprising:
   means for receiving a message in one time slot on a time multiplexed data bus, including a contention determining field and a plurality of data bits;
   means for extracting data representative of priority determined in response to a busy condition on the bus upon power up of the radiotelephone unit from said contention determining field;
   means for determining whether said message is a digitized analog message or a data message; and
   means, responsive to a determination that said message is a data message, for routing at least a portion of said message based on said contention determining field.

18. A data transfer apparatus in accordance with claim 17 wherein said digitized analog message further comprises data bits to be converted to analog signals by a codec.

19. A data transfer apparatus in accordance with claim 17 wherein said means for receiving further comprises means for receiving a message frame of six time slots.

20. A method of transferring data in a radiotelephone unit from a radiotelephone peripheral to a master unit, comprising the steps of:
   (a) receiving a message in one time slot on a time multiplexed data bus, said message including a contention determining field and a plurality of data bits;
   (b) extracting data representative of priority determined in response to a busy condition on the bus upon power up of the radiotelephone unit from said contention determining field;
   (c) determining whether said message is a digitized analog message or a data message; and
   (d) routing, in response to a determination that said message is a data message, at least a portion of said message based on said contention determining field.

21. A method in accordance with the method of claim 20 further comprising the step of (e) converting a digitized analog message to an analog voice information signal.

22. A method in accordance with the method of claim 20 wherein said step (a) of receiving a message further comprises the step of (a1) disassembling a message frame of six time slots into individual time slots.

23. A data transfer apparatus for a radiotelephone peripheral device, the data transfer apparatus having the capability of resolving data bus contention with a second data transfer apparatus on the data bus by allocating time slots on the data bus to the peripheral device, comprising:
   means for retrieving peripheral apparatus information from an information storage device in the radiotelephone peripheral device,
   means for generating a contention determining data field from said peripheral apparatus information, the contention determining data field to be transmitted within a plurality of data bits,
   means for transferring said contention determining data field to a field storage device within the data transfer apparatus,
   means for determining bus access for the data bus by comparing at least one bit of said contention determining data field with at least one equivalent bit from the second data transfer apparatus on the data bus,
   means for assigning a data bus peripheral apparatus address to the data transfer apparatus based on the outcome of said bus access determination,
   means for allocating a time slot for a radiotelephone peripheral device in response to said bus access, means for allocating unique time slots on the data bus to each radiotelephone peripheral device's data transfer apparatus for voice information, means for prioritizing between at least two radiotelephone peripheral devices when multiple radiotelephone peripheral devices are allowed to access a particular time slot in a time multiplexed manner, further comprising:

(a) means for time multiplexing peripheral devices not conveying voice information over common time slots not allocated to radiotelephone peripheral devices for voice information, and (b) means for prioritizing radiotelephone peripheral devices over common time slots not allocated to radiotelephone peripheral devices for voice information.

* * * * *

UNITED STATES PATENT AND TRADEMARK OFFICE
CERTIFICATE OF CORRECTION

PATENT NO. : 5,297,142

DATED : March 22, 1994

INVENTOR(S) : Paggeot et al.

It is certified that error appears in the above-identified patent and that said Letters Patent is hereby corrected as shown below:

In column 18, line 20: after the word "contains", insert the phrase --the value "254"--.

In column 18, line 21: delete the phrase "the value "254" ".

In column 22, line 11: replace the phrase "buffer Tri-state 907" with --Tri-state buffer 907--.

In column 22, line 17: replace the phrase "buffer Tri-state 907" with --Tri-state buffer 907--.

Column 22, line 19, replace the phrase "buffer Tri-state" with --Tri-state buffer--.

Signed and Sealed this

Twenty-seventh Day of September, 1994

Attest:

BRUCE LEHMAN

*Attesting Officer*     *Commissioner of Patents and Trademarks*